(12) United States Patent
Zhu et al.

(10) Patent No.: US 7,213,451 B2
(45) Date of Patent: May 8, 2007

(54) TIRE UNIFORMITY THROUGH COMPENSATION BETWEEN RADIAL RUN OUT AND STIFFNESS VARIATION

(75) Inventors: Fang Zhu, Greer, SC (US); Julien Matthieu Flament, Greer, SC (US)

(73) Assignee: Michelin Rechercheqet Technique, S.A. (CH)

( * ) Notice: Subject to any disclaimer, the term of this patent is extended or adjusted under 35 U.S.C. 154(b) by 275 days.

(21) Appl. No.: 10/854,086

(22) Filed: May 26, 2004

(65) Prior Publication Data
US 2005/0262933 A1  Dec. 1, 2005

(51) Int. Cl.
*E01C 23/00* (2006.01)
*B60C 23/02* (2006.01)

(52) U.S. Cl. ........................................ 73/146
(58) Field of Classification Search ............... 73/146
See application file for complete search history.

(56) References Cited

U.S. PATENT DOCUMENTS

| | | | |
|---|---|---|---|
| 4,815,004 A | 3/1989 | Beebe | |
| 5,245,867 A | 9/1993 | Sube et al. | |
| 5,396,438 A | 3/1995 | Oblizajek | |
| 5,645,465 A | 7/1997 | Vannan, III | |
| 6,065,331 A | 5/2000 | Fukasawa | |
| 6,086,452 A | 7/2000 | Lipczynski et al. | |
| 6,139,401 A | 10/2000 | Dunn et al. | |
| 6,386,945 B1 * | 5/2002 | Fahringer et al. | 451/5 |
| 6,513,372 B2 | 2/2003 | Anno et al. | |
| 6,514,441 B1 * | 2/2003 | Tanaka et al. | 264/40.1 |
| 6,581,463 B1 * | 6/2003 | Colarelli et al. | 73/460 |
| 6,606,902 B2 | 8/2003 | Koeune et al. | |
| 6,799,460 B1 * | 10/2004 | Parker et al. | 73/462 |
| 7,082,816 B2 * | 8/2006 | Zhu | 73/146 |
| 2002/0177959 A1 | 11/2002 | Williams et al. | |
| 2002/0177964 A1 | 11/2002 | Shteinhauz | |
| 2003/0149542 A1 | 8/2003 | Chang | |
| 2004/0020583 A1 | 2/2004 | Zhu et al. | |
| 2005/0081614 A1 * | 4/2005 | Zhu | 73/146 |

FOREIGN PATENT DOCUMENTS

WO   WO 2002 099377   12/2002

OTHER PUBLICATIONS

The Tire Society, *Tire Science And Technology*, vol. 19, No. 3, Jul.-Sep. 1991, ISSN 0090-8657, 19 (3) 121-176 (1991) The Tire Society, Inc. Akron, OH 44301 USA.

* cited by examiner

*Primary Examiner*—Max Noori
(74) *Attorney, Agent, or Firm*—Dority & Manning, P.A.

(57) ABSTRACT

Methodology for characterizing non-uniformity forces at a tire spindle, such as low and high speed radial force variations and high speed tangential force variations include the steps of measuring radial run out and radial or tangential force variations at high and/or low speeds. From such measurements, the contribution of a predetermined type of stiffness variation (e.g. radial, tangential, extensional, bending) to respective radial and/or tangential force variations can be determined. Signature analysis statistical methods may also be utilized to characterize such tire non-uniform forces for different steps and reference physical angles of a tire construction process. Based on the characterization of such tire non-uniform forces, additional process steps may further correspond to tire grading and/or sorting processes, physical tire modification processes and tire manufacturing processes. Tire correction mechanisms and/or feedback control in a tire manufacturing process preferably yield tires having radial run out and stiffness variation parameters that are out of phase for one or more harmonics, thus yielding a reduction in the non-uniformity forces such as radial and tangential force variations at a tire spindle.

60 Claims, 15 Drawing Sheets

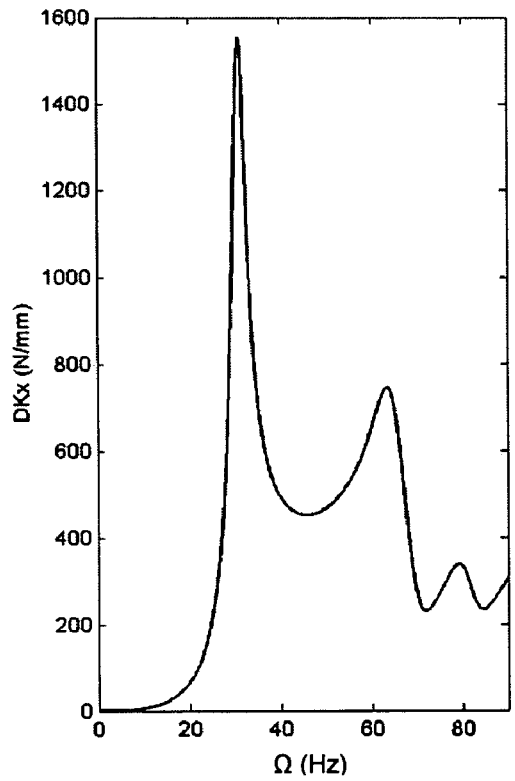 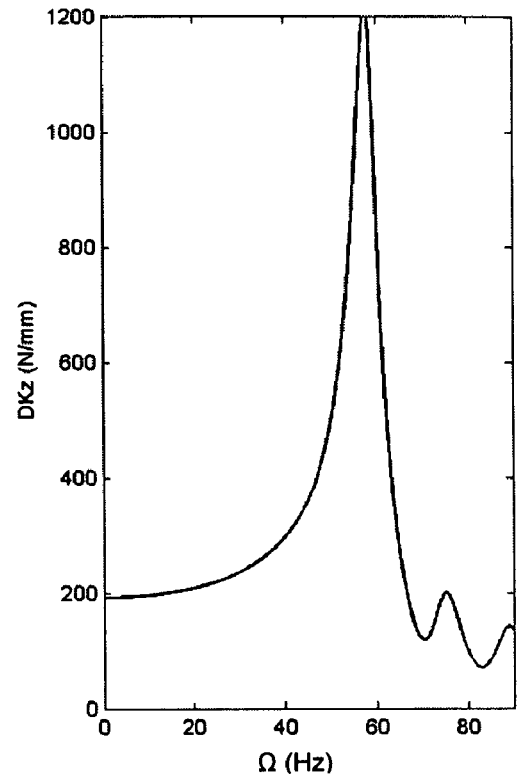
*Figure 5A*   *Figure 5B*

TIRE UNIFORMITY THROUGH COMPENSATION BETWEEN RADIAL RUN OUT AND STIFFNESS VARIATION

FIELD OF THE INVENTION

The present invention generally concerns technology for characterizing tire uniformity performance parameters, such as radial and tangential force variations that affect tire uniformity at both low and high speeds. Characterization and prediction of such tire parameters and others may subsequently be used to grade, sort, or provide correction to manufactured products and/or control manufacturing aspects thereof.

BACKGROUND OF THE INVENTION

One exemplary cause of vehicle vibrations at both high and low traveling speeds corresponds to force variations at respective tire spindle locations. This phenomenon is typically referred to as tire uniformity. Tire high speed uniformity (HSU) may be of particular interest as related to tire performance levels, since potential non-uniformity characteristics of a tire can produce a significantly greater amount of vibration at faster highway road speeds, such as those in excess of 25 mph.

High speed uniformity (HSU) has become a growing concern in the automobile industry, and thus many tire manufacturers are being pressured to implement HSU control. Tire HSU measurement, however, has been difficult and quite costly, making HSU industrial control very difficult.

A multitude of various tire parameters have conventionally been identified and measured in an effort to predict and control these force variations and any resultant undesirable levels of vibration. In accordance with aspects of the present invention, it is desired to combine multiple tire parameter measurements to predict or determine tire uniformity, including the radial and tangential force variations at both low and high speeds.

One known attempt at predicting tire HSU is disclosed in U.S. Pat. No. 5,396,438 (Oblizajek), which predicts HSU based on multiple low speed parameters such as radial run out (RRO), instantaneous rolling radius (IRR), and radial force variation (RFV) as obtained on low speed uniformity machines. Yet another example related to aspects of high speed uniformity is found in U.S. Pat. No. 6,065,331 (Fukasawa), which predicts higher order components of high speed uniformity based on low speed uniformity measurements. Low speed uniformity machines are well established and exist in all tire production lines. The above-referenced patents are incorporated herein by reference for all purposes. In light of these previous attempts to predict HSU parameters and the current marketplace focus on controlling HSU levels, it is desired to provide improved technology for characterizing tire uniformity at both high and low speeds.

There are many contributing factors to tire HSU, and thus one of the biggest challenges in effectively controlling tire uniformity lies in being able to properly identify such contributing factors in order to control corresponding levels of tire force variation and vehicle vibration. It has been determined in accordance with the present subject matter how both radial run out (such as created by geometrical non-uniformity or mass uneven distribution) and tire stiffness variations can cause both radial and tangential force variations. As such, it is desired in accordance with the presently disclosed technology to provide features for determining the contributions of radial and tangential force variations to tire non-uniformity at multiple harmonic levels.

Although known technology for characterizing tire uniformity and affecting associated aspects of tire manufacturing have been respectively developed, no design has emerged that generally encompasses all of the desired characteristics as hereafter presented in accordance with the subject technology.

SUMMARY OF THE INVENTION

In view of the recognized features encountered in the prior art and addressed by the present subject matter, improved technology is presented for characterizing non-uniformity forces at a tire spindle. More particularly, features for characterizing radial force variations at high and low speeds and tangential force variations at high speed are presented. Characterization can be further applied to tire grading and/or sorting processes, physical tire modification processes and tire manufacturing processes.

Various features and aspects of the subject technology concerning tire parameter characterization and corresponding tire manufacturing aspects offer a plurality of advantages. One exemplary advantage corresponds to the present subject matter providing both effective and efficient technology for predicting tire uniformity, especially high speed uniformity (HSU), a tire parameter of more recently recognized significance. Tire high speed uniformity is predicted and controlled based on determination of respective radial run out and stiffness variation contribution to tire spindle force variations.

Mathematical analysis presented herein illustrates how radial run out (RRO), which can be created by geometrical non-uniformity or, at relatively high speeds, by mass uneven distribution, generates Fx and Fz (tire spindle non-uniform forces in respective X and Z directions.) At relatively low speeds, the transfer function from RRO to Fx is close to zero due to the pinned condition at the tire spindle enabling a tire to freely rotate. The transfer function increases as the tire rotating speed increases until the first rotational mode is excited. Therefore, at relatively higher speeds, Fx can potentially be quite large. The transfer function from RRO to Fz is different since the tire is typically restricted from moving in the Z direction. Fz is proportional to RRO at relatively low speeds, and can also be quite large if the first vertical resonant mode is excited at relatively high rotational speeds.

Mathematical analysis presented herein also illustrates how Fx and Fz can be generated by stiffness variations in a tire. As compared with the contribution from RRO, stiffness variation effect on Fz is relatively small. If rotational tire speed is high enough that the tire's rotational mode is excited by a certain harmonic stiffness variation, Fx of that harmonic can be quite large. If however, the phase angle of stiffness variation is positioned opposite to that of the same harmonic RRO, Fx of that harmonic can be dramatically reduced. Fz can also be reduced, but in some instances to a lesser degree than potential reduction in Fx forces.

In one exemplary embodiment of the present subject matter, a method of characterizing low speed radial force variations in a tire includes several steps. First and second steps correspond to respectively measuring radial run out (RRO) and radial force variation (RFV) at predetermined low speeds (such as on the order of less than about 180 rotations per minute). From these measurements, the portion of low speed RFV that is created by radial stiffness variation (RSV) (or other preselected type of stiffness variation) may be calculated from one or more equations of motion of a tire ring under pressure and rotation, equations for the radial forces acting on a tire ring at the contact patch, and equations for the radial forces in a fixed coordinate representation. Based on the determined contributions of RRO and RSV to RFV, the tire may be graded or sorted into different categories. If a tire is found to have unacceptable levels of low speed radial force variations, then the tire could be subjected to physical tire modifications, such as grinding or adding rubber mass to predetermined tire locations, in order to create an additional radial run out in the tire. Such additional radial run out is preferably characterized such that the vectorial sum of the initial measured radial run out and the additionally created radial run out is out of phase with the tire radial stiffness variation for one or more harmonics. Other types of stiffness variation for which the above exemplary steps may be utilized to compensate with radial run out include tangential stiffness variation, bending stiffness variation, and tire belt extensional stiffness variation.

In another exemplary embodiment of the present subject matter, low speed radial force variations in a tire may be compensated by creation of additional stiffness variation as opposed to creation of additional radial run out. In accordance with such an exemplary embodiment, radial run out of one or more constructed tires is obtained. The radial run out measurements may occur at a predetermined rotational speed such as one less than about 180 rotations per minute and at a relatively low pressure such as less than about 1.0 bar. From the radial run out measurements, a value for stiffness variation (e.g., one or more of radial, tangential, bending, and extensional stiffness variations) may be determined that would result in minimized radial force variations for the measured radial run out values. Such a determined stiffness variation may then be created, such as in subsequently created tires by applying feedback to one or more steps of a tire building process.

Additional embodiments of the subject technology combine aspects of the above methods for characterizing low speed radial force variations to a method of manufacturing tires, in which the characterization steps are applied to each tire in a plurality of sets of tires that are constructed such that each set has a different combination of reference physical angles for different steps of the tire building process. The reference physical angles may correspond to the locations of overlap or variation in multiple respective tire layers. Low speed RRO and RFV measurements are obtained for each tire in each constructed set, from which respective RSV contributions can be determined. A statistical method, such as a signature analysis, may be applied to estimate low speed RRO and RSV signatures for each step in the tire building process, from which a determination can be made regarding which tire set's combination of relative angles of the different tire building process steps results in low speed RRO and RSV signatures being out of phase for one or more harmonics, thus yielding reduced levels of radial force variation at low speed. Again, other types of stiffness variation than the RSV may be the focus of such exemplary methodology.

In other exemplary embodiments of the present subject matter, methods of respectively characterizing high speed radial or tangential force variations in a tire include several steps. First and second steps correspond to respectively measuring radial run out (RRO) and radial force variation (RFV) or tangential force variation (TFV) at predetermined low speeds (such as on the order of less than about 180 rotations per minute). From these measurements, the portion of low speed RFV/TFV that is created by radial stiffness variation (RSV) may be calculated from one or more equations of motion of a tire ring under pressure and rotation, equations for the radial/tangential forces acting on a tire ring at the contact patch, and equations for the radial/tangential forces in a fixed coordinate representation. Radial run out is also measured at a predetermined high speed, such as on the order of at least 300 rotations per minute. Based on the determined contributions of high speed RRO and RSV to RFV/TFV, the tire may be graded or sorted into different categories. If a tire is found to have unacceptable levels of high speed radial/tangential force variations, then the tire could be subjected to physical tire modifications, such as grinding or adding rubber mass to predetermined tire locations, in order to create an additional high speed radial run out in the tire. Such additional radial run out is preferably characterized such that the vectorial sum of the initial radial run out measured at the predetermined high speed and the additionally created radial run out is out of phase with the tire radial stiffness variation for one or more harmonics. Other types of stiffness variation for which the above exemplary steps may be utilized to compensate with radial run out include tangential stiffness variation, bending stiffness variation, and tire belt extensional stiffness variation.

In still further exemplary embodiments of the present subject matter, high speed radial/tangential force variations in a tire may be compensated by creation of additional stiffness variation as opposed to creation of additional radial run out. In accordance with such an exemplary embodiment, radial run out of one or more constructed tires is obtained. The radial run out measurements may occur at a predetermined rotational speed such as one greater than about 300 rotations per minute and at a relatively low pressure such as less than about 1.0 bar. From the radial run out measurements, a value for stiffness variation (e.g., one or more of radial, tangential, bending, and extensional stiffness variations) may be determined that would result in minimized radial/tangential force variations for the measured radial run out values. Such a determined stiffness variation may then be created, such as in subsequently created tires by applying feedback to one or more steps of a tire building process.

Additional embodiments of the subject technology combine aspects of the above methods for characterizing high speed radial/tangential force variations methods of manufacturing tires, in which the characterization steps are applied to each tire in a plurality of sets of tires that are constructed such that each set has a different combination of reference physical angles for different steps of the tire building process. The reference physical angles may correspond to the locations of overlap or variation in multiple respective tire layers. Low and high speed RRO and RFV/TFV measurements are obtained for each tire in each constructed set, from which respective RSV contributions can be determined. A statistical method, such as a signature analysis, may be applied to estimate high speed RRO and RSV signatures for each step in the tire building process, from which a determination can be made regarding which tire set's combination of relative angles of the different tire building process steps results in high speed RRO and RSV signatures being out of phase for one or more harmonics, thus yielding reduced levels of radial/tangential force variation at high speed. Again, other types of stiffness variation than the RSV may be the focus of such exemplary methodology.

Additional objects and advantages of the present subject matter are set forth in, or will be apparent to, those of ordinary skill in the art from the detailed description herein. Also, it should be further appreciated that modifications and variations to the specifically illustrated, referred and discussed features and steps hereof may be practiced in various embodiments and uses of the invention without departing from the spirit and scope of the subject matter. Variations may include, but are not limited to, substitution of equivalent means, features, or steps for those illustrated, referenced, or discussed, and the functional, operational, or positional reversal of various parts, features, steps, or the like.

Still further, it is to be understood that different embodiments, as well as different presently preferred embodiments, of the present subject matter may include various combinations or configurations of presently disclosed features, steps, or elements, or their equivalents (including combinations of features, parts, or steps or configurations thereof not expressly shown in the figures or stated in the detailed description of such figures).

Additional embodiments of the present subject matter, not necessarily expressed in this summarized section, may include and incorporate various combinations of aspects of features, components, or steps referenced in the summarized objectives above, and/or other features, components, or steps as otherwise discussed in this application. Those of ordinary skill in the art will better appreciate the features and aspects of such embodiments, and others, upon review of the remainder of the specification.

BRIEF DESCRIPTION OF THE DRAWINGS

A full and enabling disclosure of the present subject matter, including the best mode thereof, directed to one of ordinary skill in the art, is set forth in the specification, which makes reference to the appended figures, in which:

FIGS. 5A and 5B provide respective exemplary graphical illustrations of transfer functions DKx and DKz from radial run out (RRO) to Fx and Fz versus frequency in accordance with aspects of the present subject matter;

Figure 1:
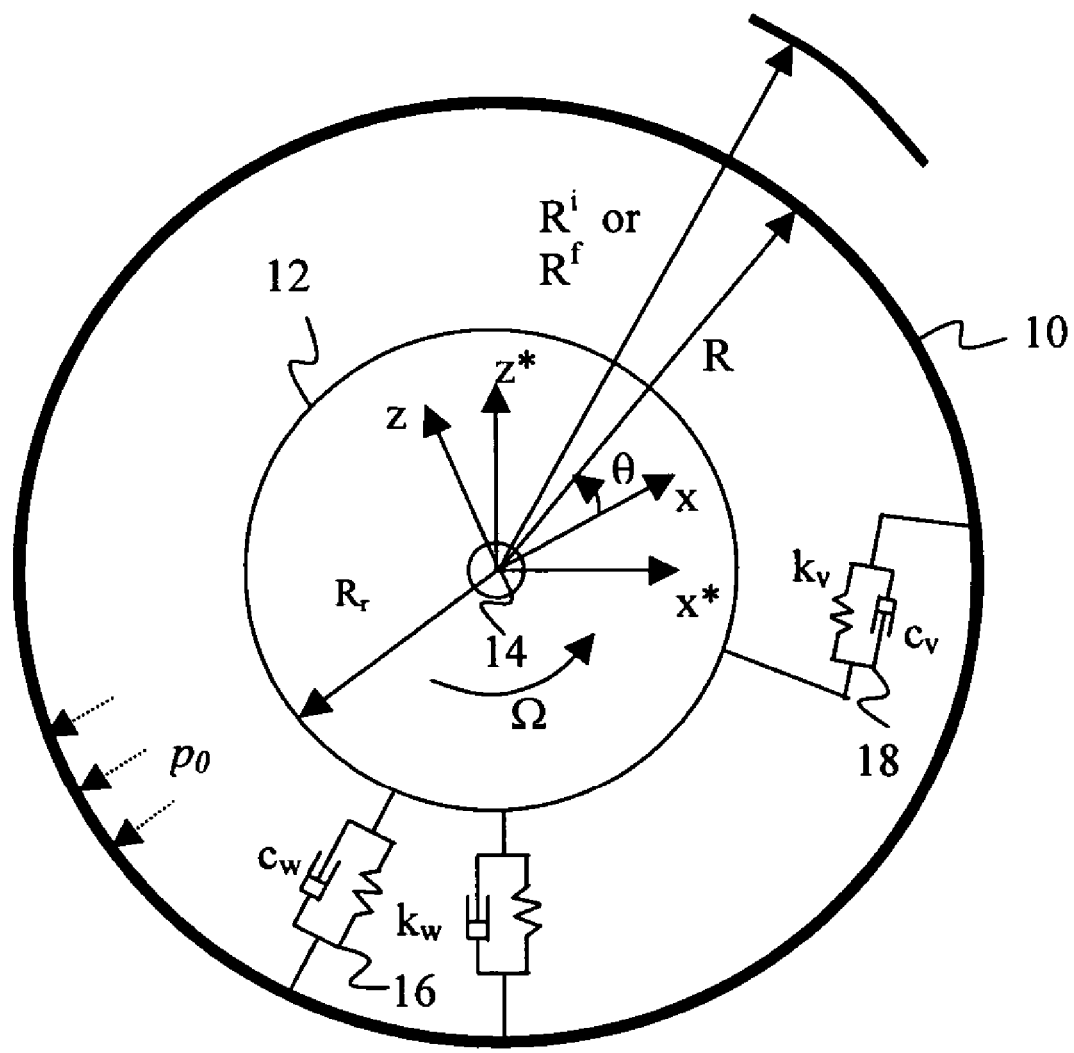
FIG. 1 illustrates a schematic diagram of an exemplary tire ring model and coordinate system in accordance with analytical aspects of the presently disclosed technology.

Repeat use of reference characters throughout the present specification and appended drawings is intended to represent same or analogous features or elements of the invention.

DETAILED DESCRIPTION OF THE PREFERRED EMBODIMENTS

As discussed in the Summary of the Invention section, the present subject matter concerns aspects of characterizing low and high speed uniformity aspects of a tire. Respective contributions of radial run out and stiffness variations (e.g., radial, tangential, bending, and extensional stiffness variations) to radial and tangential force variations are determined. Characterization of such tire parameters can be further applied to tire sorting and/or grading processes and improvements to tire manufacturing, for example in control and optimization of process reference angles.

Figure 13:
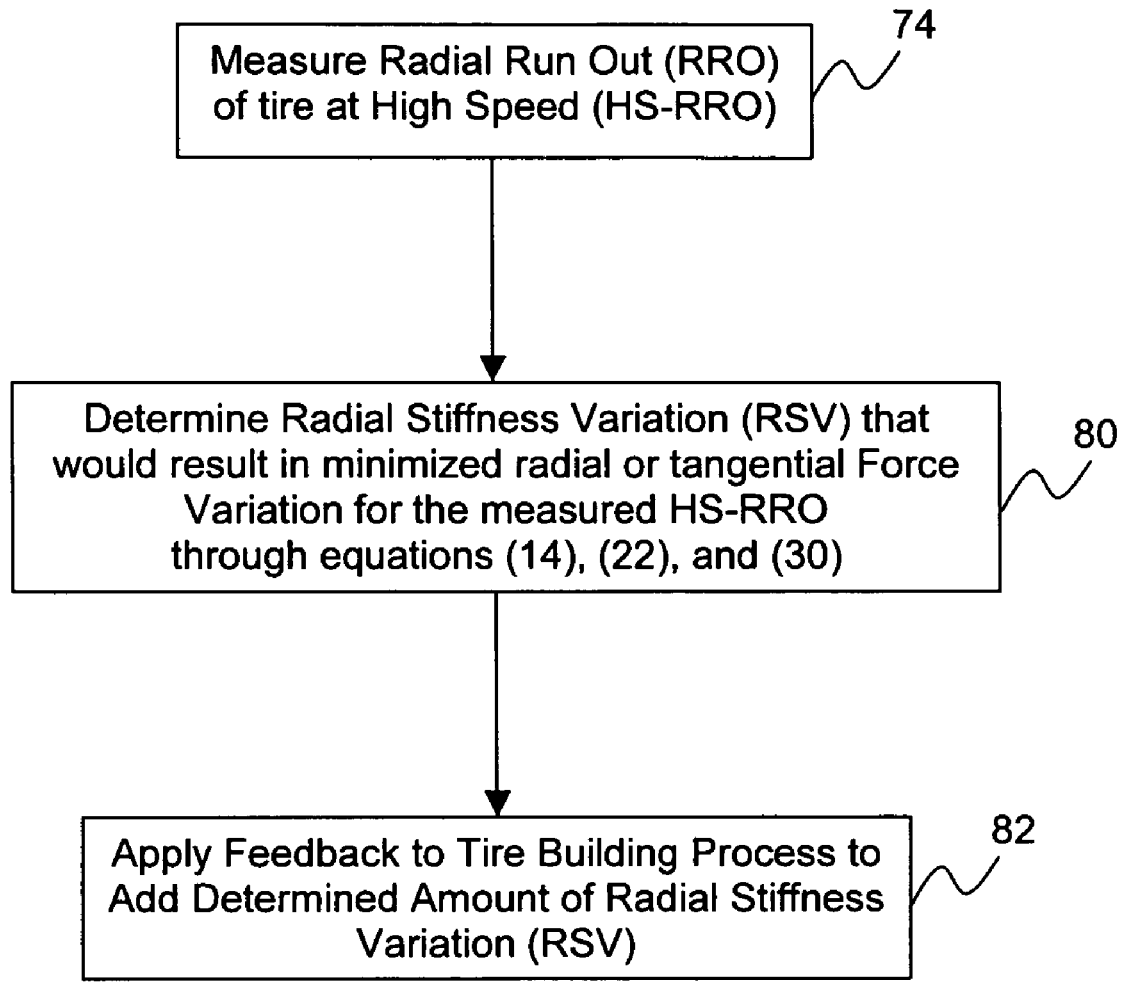
FIG. 13 provides a block diagram of an exemplary method for optimizing exemplary aspects of a tire building process based on characterization of high speed radial or tangential force variation.
Figure 14:
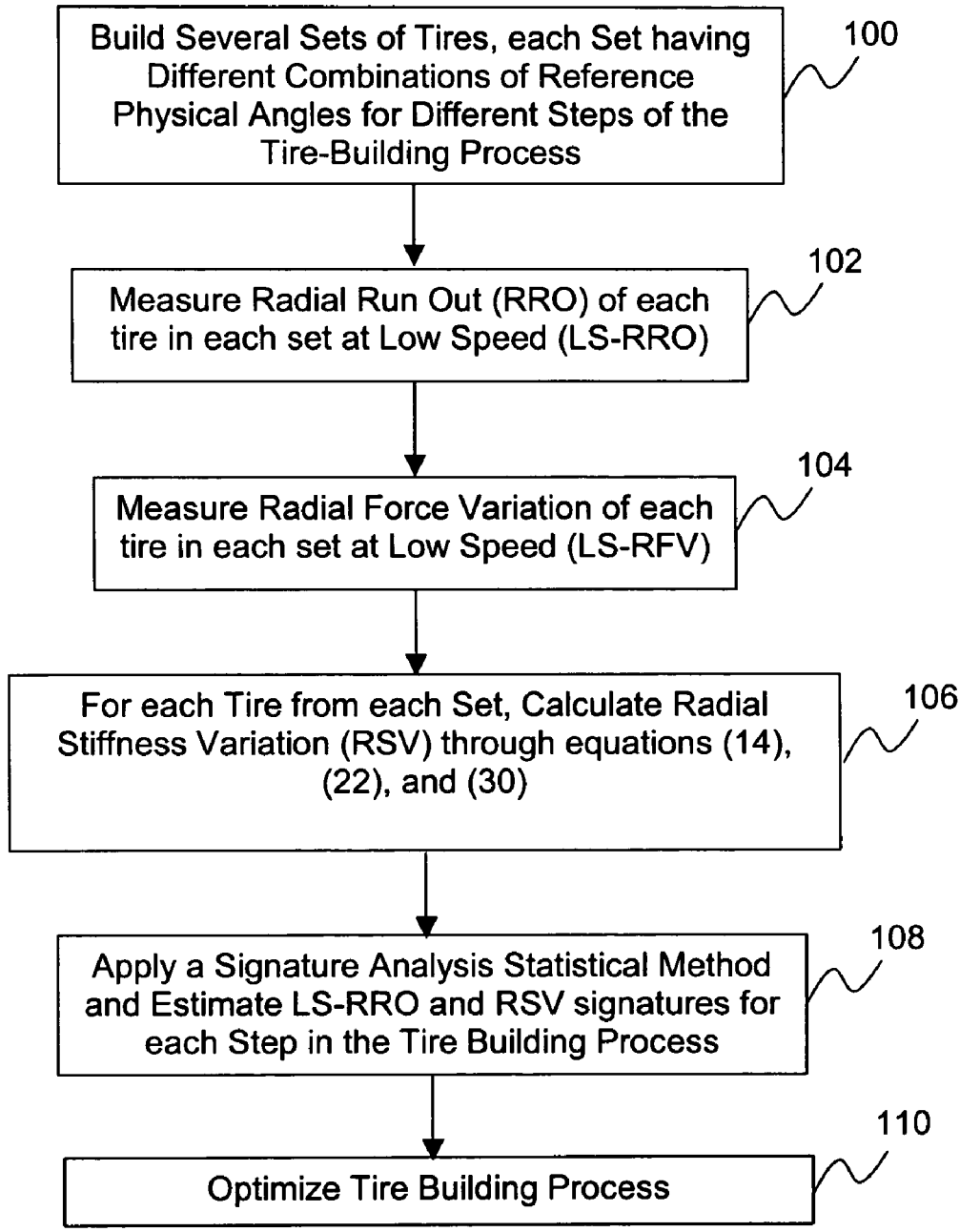
FIG. 14 provides a block diagram of an exemplary tire manufacturing process based on characterization of tire low speed radial force variations in accordance with the present subject matter.
Figure 15:
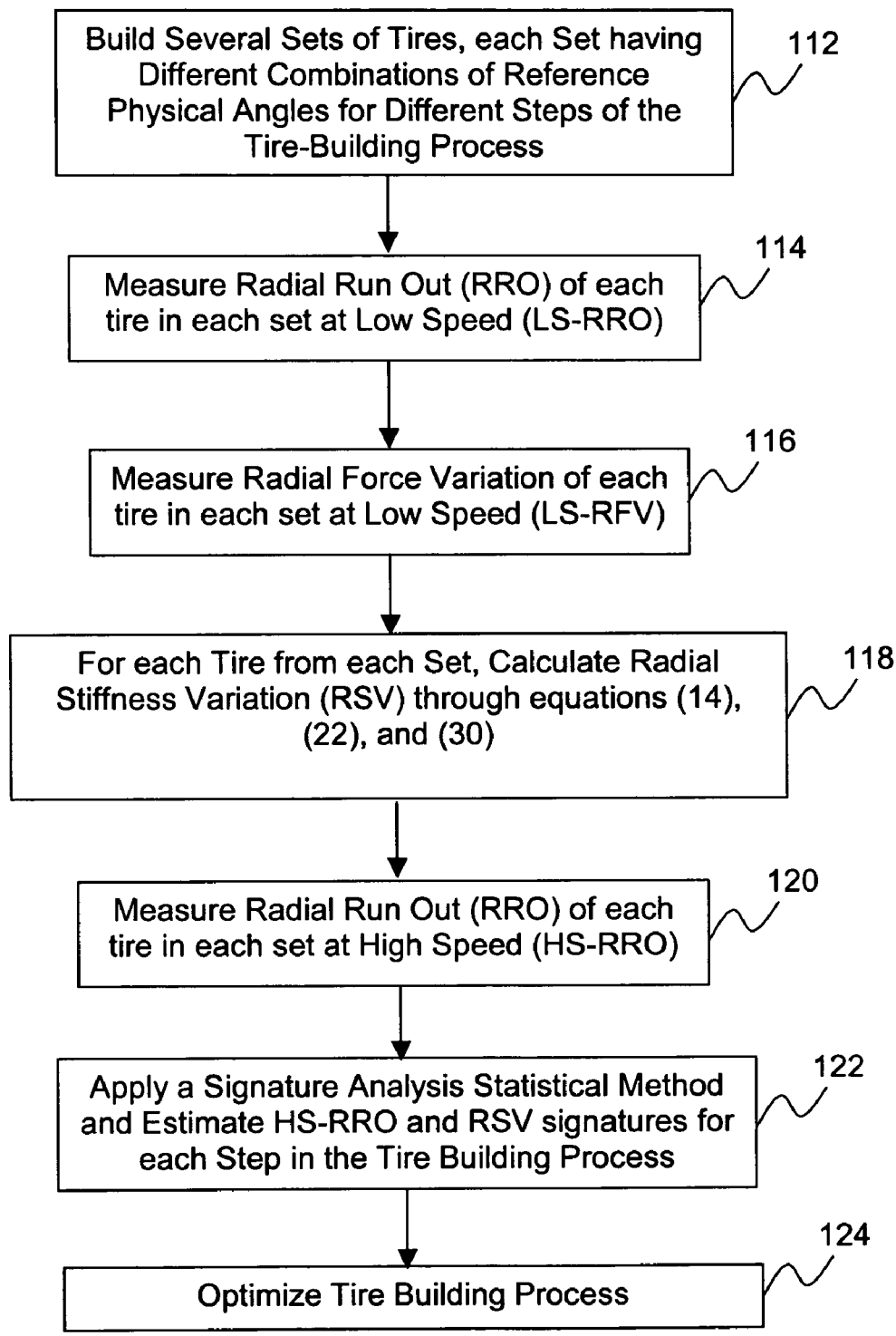
FIG. 15 provides a block diagram of an exemplary tire manufacturing process based on characterization of tire high speed radial or tangential force variations in accordance with the present subject matter.

Aspects of tire modeling and numerical analysis that provide initial basis for the process applications and methodology of the present subject matter are presented hereafter with respect to FIGS. 1–8D, respectively. More particularly, discussion with respect to FIGS. 1–4, respectively, corresponds to tire modeling and formulation of equations for calculating radial run out as well as high-speed spindle forces. FIGS. 5–8D, respectively, provide graphical representations of numerical examples of radial run out and tire spindle force measurements in accordance with the equations presented in accordance with FIGS. 1–4. The fundamentals presented with respect to FIGS. 1–8D are subsequently applied to exemplary methodology in accordance with the present subject matter. FIGS. 9–13 provide respective exemplary representation of features and steps for characterizing and/or correcting tire high speed uniformity factors such as low and high speed radial and tangential force variations. FIGS. 14–15 illustrate respective exemplary processes for tire manufacturing, based on analysis of tire uniformity attributes such as low and high speed radial and tangential force variations.

In accordance with aspects of the presently disclosed technology, determination of the various sources of tire uniformity at high and low speeds begins with proper modeling of a tire and its various parameters, including representative equations of motion.

Referring now to FIG. 1, a tire is modeled as a generally elastic ring 10 connected to a mounting fixture 12, such as a wheel rim or other type of rigid disk. The wheel center is pinned at its axis of rotation 14. Tire 10 is connected through distributed radial 16 (or normal) and tangential 18 springs and dampers to the rigid circular rim 12. The tire ring rotates at a nominal speed $\Omega$ about the wheel center 14. Two coordinate systems are used to characterize the system illustrated in FIG. 1. The first one is the fixed coordinate system (Ox*z*). This is an inertial coordinate system that does not move at all. The second coordinate system is denoted by Oxz that rotates with the tire ring at speed $\Omega$. The following terminology will be used to reference certain parameters of a tire in rotation:

w: displacement in radial direction.
v: tangential displacement.
$p_0$: inflation pressure.
R: tire radius.
$w_c$: loaded deformation at the contact patch in radial direction.
$v_c$: loaded deformation at the contact patch in tangential direction.
A: cross sectional area of the tire ring.
b: width of the tire ring.
$I_r$: moment of inertia of the rim and machine spindle.
$k_w$: radial stiffness (Tread is excluded).
$k_v$: tangential stiffness (Tread is excluded).
$c_w$: radial damping (Tread is excluded).
$c_v$: tangential damping (Tread is excluded).
$k_r$: tread radial stiffness.
$k_\theta$: tread tangential stiffness.
$c_r$: tread radial damping.
$c_\theta$: tread tangential damping.
EI: summit block bending stiffness.
$\Omega$: tire rotating speed.
$\theta_r$: rim rotation relative to $\Omega$.
$R_r$: rim radius.
$q_w$: external force in radial direction.
$q_v$: external force in tangential direction.

Referring still to FIG. 1, assume the ring 10 initially is circular before pressure and rotation. Therefore, in the rotating coordinate system, the radius of an arbitrary ring element located at the angle $\theta$ can be described as $$R = R n_r, \quad (1)$$

where $n_r$ is the unit vector in the radial direction and R is the initial radius of the tire.

After pressure and rotation, but no loading, the ring element moved to another position, is described as $$R^i = (R + w^i) n_r + v^i n_\theta, \quad (2)$$

where $w^i$ and $v^i$ are respectively the ring deformation along the radial and tangential directions, and $n_\theta$ is the unit vector in the tangential direction. Note that, in the rotating coordinate system and under the unloaded condition, the system is not a function of time. This state is referred to as the unloaded state or the steady state or free spin state.

Finally, the contact patch is imposed to the tire so that a crush radius $R_c$ is generated. Relative to the rotating coordinate system, the contact patch is rotating along the ring with speed $-\Omega$ while the crush radius is maintained. In this case, the ring element is defined by $$R^f = (R + w^i + w^f) n_r + (v^i + v^f) n_\theta, \quad (3)$$

where $w^f$ and $v^f$ denote respectively the ring deformation along the radial and tangential directions due to the application of the contact patch. Since the contact patch is moving, $w^f$ and $v^f$ are functions of time. This state is referred to as the loaded state or the final state.

The velocity of the ring element can be derived as $$\dot{R}^f = (\dot{w}^f - \Omega(v^i + v^f)) n_r + (\dot{v}^f + \Omega(R + w^i + w^f)) n_\theta, \quad (4)$$

where the dot above any variables represents the differentiation with respect to time.

The ring is modeled as a linear elastic rod obeying Kirchhoff assumptions for rod deformation. The curvature and strain for the loaded condition are given by $$\kappa^f = \kappa^i + \frac{\partial}{R \partial \theta}\left(\kappa^i v^f - \frac{\partial w^f}{R \partial \theta}\right), \quad (5)$$

$$\varepsilon^f = \varepsilon^i + \frac{\partial v^f}{R \partial \theta} + \kappa^i w^f + \frac{1}{2}\left(\kappa^i v^f - \frac{\partial w^f}{R \partial \theta}\right)^2,$$

where $\kappa^i$ and $\epsilon^i$ are the curvature and strain for the unloaded condition and given by $$\kappa^i = \frac{1}{R} + \frac{\partial}{R \partial \theta}\left(\frac{1}{R} v^i - \frac{\partial w^i}{R \partial \theta}\right), \quad (6)$$

$$\varepsilon^i + \frac{\partial v^i}{R \partial \theta} + \frac{1}{R} w^i + \frac{1}{2}\left(\frac{1}{R} v^i - \frac{\partial w^i}{R \partial \theta}\right)^2,$$

If the ring is in-extensible, the strain is zero. Neglecting nonlinear terms gives, $$w^i = -\frac{\partial v^i}{\partial \theta}, \quad w^f = -\frac{\partial v^f}{R \kappa^i \partial \theta}. \quad (7)$$

The above in-extensible assumption will be used in the remaining explanation of the presently disclosed fundamentals of tire uniformity characterization.

The potential energy for the system of FIG. 1 can be expressed as $$\prod_s = \frac{1}{2} \int_0^{2\pi} [EA(\varepsilon^f)^2 + EI(\kappa^f)^2 + \\ k_w(w^i + w^f)^2 + k_v(v^i + v^f - R_r \theta_r)^2] R d\theta, \quad (8)$$

where EA, EI, $k_w$, and $k_v$ are respectively the extensional stiffness, bending stiffness, radial stiffness, and the tangential stiffness of the tire ring. $R_r$ and $\theta_r$ are respectively the rim radius and the rim rotational displacement relative to the rotating coordinate system.

The kinetic energy for the system of FIG. 1 is given by $$\prod_k = \frac{1}{2}\int_0^{2\pi} \rho AR[(\dot{w}^f - \Omega(v^i + v^f))^2 + (\dot{v}^f + \Omega(R + w^i + w^f))^2]d\theta + \frac{1}{2}I_r(\Omega - \dot{\theta}_r)^2, \quad (9)$$

where $\rho A$ is the tire summit linear mass density and $I_r$ is the rim moment of inertia.

The virtual work done by the external forces, inflation pressure, and damping is $$\delta\prod_w = \quad (10)$$

$$-\int_0^{2\pi}[c_w \dot{w}^f \delta w^f + c_v(\dot{v}^f - R_r \dot{\theta}_r)(\delta v^f - R_r \delta\theta_r) - q_w \delta w^f - q_v \delta v^f]$$

$$Rd\theta + \int_0^{2\pi} p_0 b$$

$$\left[\left(1 + \frac{1}{R}\left(\frac{\partial(v^i + v^f)}{\partial\theta} + w^i + w^f\right)\right)\delta w^f - \frac{1}{R}\left(\frac{\partial(w^i + w^f)}{\partial\theta} - v^i - v^f\right)\delta v^f\right]Rd\theta$$

where $c_w$, and $c_v$ are respectively the tire radial and tangential damping, $q_w$ and $q_v$ are respectively the external forces acting in the radial and tangential directions, $p_0$ is the inflation pressure, and b is the tire summit width.

Hamilton's Principle provides the following variation equation $$\int_0^1 (\delta\Pi_k - \delta\Pi_s + \delta\Pi_w)dt = 0, \quad (11)$$

where t represents the time.

Substituting Equations (8) to (10) into Equation (11) and performing some derivations yields the following equations of motion.

$$-\frac{\partial^2(EI\kappa^f)}{R^2\partial\theta^2} + \frac{\partial}{R\partial\theta}\left(EA\varepsilon^f\left(\kappa^i v^f - \frac{\partial w^f}{R\partial\theta}\right)\right) + EA\varepsilon^f \kappa^i + \quad (12)$$

$$k_w(w^i + w^f) + \rho A[\ddot{w}^f - 2\Omega\dot{v}^f - \Omega^2(w^i + w^f)] -$$

$$\frac{p_0 b}{R}\left(\frac{\partial(v^i + v^f)}{\partial\theta} + w^i + w^f\right) + c_w \dot{w}^f = q_w + p_0 b + \rho A R \Omega^2$$

$$-\frac{\kappa^i \partial(EI\kappa^f)}{R\partial\theta} - \frac{\partial(EA\varepsilon^f)}{R\partial\theta} + EA\varepsilon^f \kappa^i\left(\kappa^i v^f - \frac{\partial w^f}{R\partial\theta}\right) +$$

$$k_v(v^i + v^f - R_r\theta_r) + \rho A[\ddot{v}^f + 2\Omega\dot{w}^f - \Omega^2(v^i + v^f)] +$$

$$\frac{p_0 b}{R}\left(\frac{\partial(w^i + w^f)}{\partial\theta} - v^i - v^f\right) + c_v(\dot{v}^f - R_r\dot{\theta}_r) = q_v,$$

$$I_r\ddot{\theta}_r - \int_0^{2\pi} RR_r k_v(v^i + v^f - R_r\theta_r)d\theta - \int_0^{2\pi} RR_r c_v(\dot{v}^f - R_r\dot{\theta}_r)d\theta = 0$$

where $\kappa^f$, $\varepsilon^f$, $\kappa^i$ and $\varepsilon^i$ are defined by Equations (5) and (6).

Boundary conditions are those that all variables must be continuous at $\theta=0$. In the steady state (free spin state) when the tire is not loaded, all time varying variables are zero. In this case, equations (12) simplify to $$-\frac{\partial^2\left(\frac{EI}{R^4}\left(\frac{\partial v^i}{\partial\theta} - \frac{\partial^2 w^i}{\partial\theta^2}\right)\right)}{\partial\theta^2} + \quad (13)$$

$$\frac{EA}{R^2}\left(\frac{\partial v^i}{\partial\theta} + w^i\right) + k_w w^i - \rho A\Omega^2 w^i - \frac{p_0 b}{R}\left(\frac{\partial v^i}{\partial\theta} + w^i\right) =$$

$$q_w^i + p_0 b + \rho A R\Omega^2 - \frac{\partial\left(\frac{EI}{R^4}\left(\frac{\partial v^i}{\partial\theta} - \frac{\partial^2 w^i}{\partial\theta^2}\right)\right)}{\partial\theta} - \frac{\partial\left(\frac{EA}{R^2}\left(\frac{\partial v^i}{\partial\theta} + w^i\right)\right)}{\partial\theta} +$$

$$k_v(v^i - R_r\theta_r) - \rho A\Omega^2 v^i + \frac{p_0 b}{R}\left(\frac{\partial w^i}{\partial\theta} - v^i\right) = q_v^i$$

$$\int_0^{2\pi} RR_r k_v(v^i - R_r\theta_r)d\theta = 0$$

where $q_w^i$ and $q_v^i$ are respectively the time invariant external forces acting in the radial and tangential directions. Only linear terms are kept in the above equation.

Equations (13) represent the equations of motion of the tire ring under the pressure and rotation. Substituting Equations (13) into Equations (12) and neglecting higher order terms yields the differential equations of tire loaded against a road surface.

$$\frac{\partial^2\left(\frac{EI}{R^4}\frac{\partial}{\partial\theta}\left(\kappa^0 v^f - \frac{\partial w^f}{\partial\theta}\right)\right)}{\partial\theta^2} + \quad (14)$$

$$\frac{\partial}{\partial\theta}\left(\frac{EA}{R^2}\left(\frac{\partial v^f}{R\partial\theta} + \frac{1}{R}w^f\right)\left(\kappa^0 v^f - \frac{\partial w^f}{\partial\theta}\right)\right) + \frac{EA}{R^2}\kappa^0\left(\frac{\partial v^f}{\partial\theta} + \kappa^0 w^f\right) +$$

$$k_w w^f + \rho A[\ddot{w}^f - 2\Omega\dot{v}^f - \Omega^2 w^f] - \frac{p_0 b}{R}\left(\frac{\partial v^f}{\partial\theta} + w^f\right) + c_w \dot{w}^f = q_w$$

$$-\frac{\kappa^0\left(\frac{EI}{R^4}\frac{\partial}{\partial\theta}\left(\kappa^0 v^f - \frac{\partial w^f}{\partial\theta}\right)\right)}{\partial\theta} - \frac{\partial\left(\frac{EA}{R^2}\left(\frac{\partial v^f}{\partial\theta} + \kappa^0 w^f\right)\right)}{\partial\theta} +$$

$$\frac{EA}{R^2}\kappa^0\left(\frac{\partial v^f}{R\partial\theta} + \frac{1}{R}w^f\right)\left(\kappa^0 v^f - \frac{\partial w^f}{\partial\theta}\right) +$$

$$k_v(v^f - R_r\theta_r^f) + \rho A[\ddot{v}^f + 2\Omega\dot{w}^f - \Omega^2 v^f] +$$

$$\frac{p_0 b}{R}\left(\frac{\partial w^f}{\partial\theta} - v^f\right) + c_v(\dot{v}^f - R_r\dot{\theta}_r^f) = q_v$$

$$I_r\ddot{\theta}_r - \int_0^{2\pi} RR_r c_v(\dot{v}^f - R_r\dot{\theta}_r^f)d\theta - \int_0^{2\pi} RR_r k_v(v^f - R_r\theta_r^f)d\theta = 0$$

where, $$\kappa^0 = R\kappa^i = 1 + \frac{1}{R}\left(\frac{\partial v^i}{\partial\theta} - \frac{\partial^2 w^i}{\partial\theta^2}\right). \quad (15)$$

Additional simplifications of equations (14) (not presented here) can be made by recognizing that variances in tire mass, radius, and stiffness will not have a significant effect on the tire dynamic properties, i.e., resonant frequencies, modes, and dampings.

Figure 2:
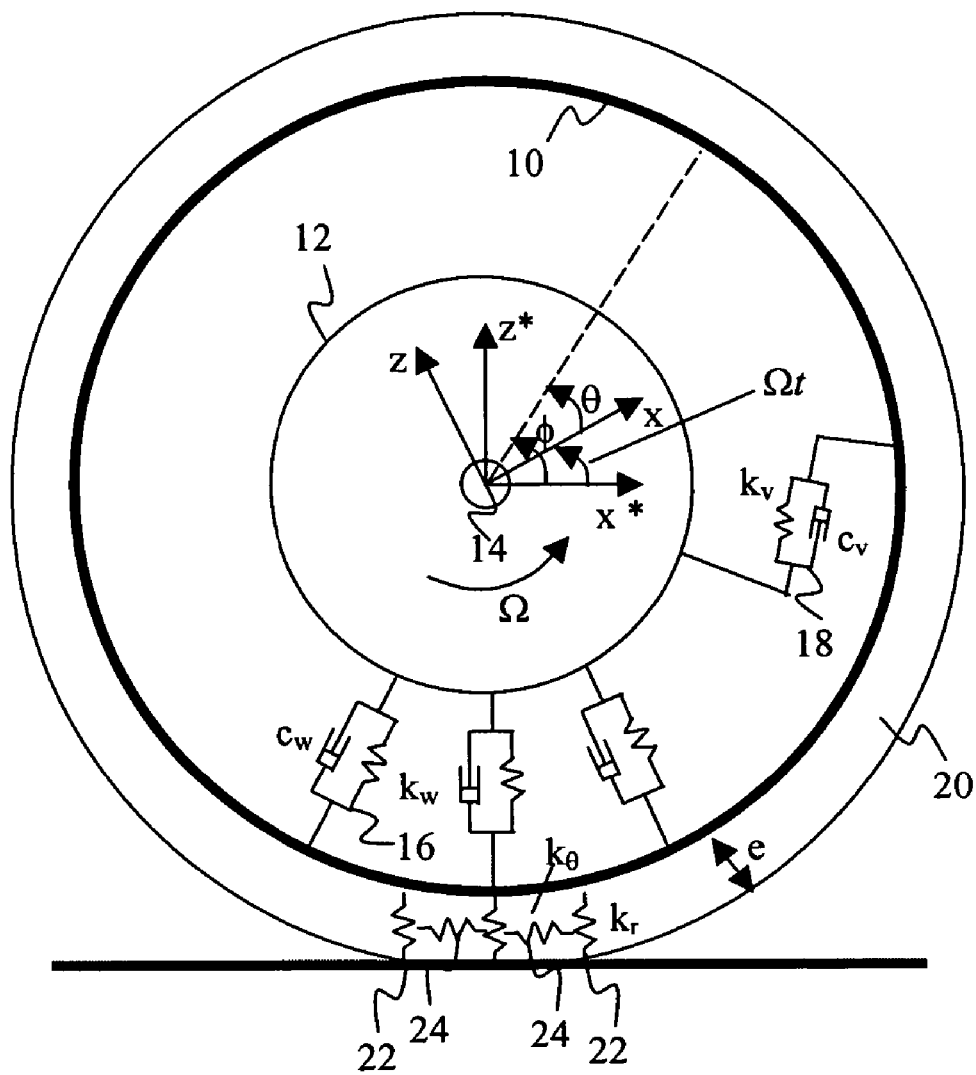
FIG. 2 illustrates a schematic diagram of an exemplary tire ring with tread and contact patch model in accordance with analytical aspects of the presently disclosed technology.

Referring now to FIG. 2, aspects of tire modeling to derive the contact patch boundary condition, the tread needs to be introduced in the model. The tread 20 is modeled as the springs in radial 22 and tangential 24 directions with the spring rate as $k_r$ and $k_\theta$, respectively. Dampers are not shown, but will be included in some of the tire modeling equations.

In the rotating coordinate system, the radius of the tread at the contact patch is expressed as $$R_T^f = (R+e+w_T^i+w_T^f)n_r + (v_T^i+v_T^f)n_\theta, \quad (16)$$

where e is the thickness of the tread. The deformation of the tread at the contact patch is given by $$\varepsilon = R_r^f - R^f - en_r \quad (17)$$

$$(R+e+w_T^i+w_T^f)n_r + (v_T^i+v_T^f)n_\theta - (R+w^i+w^f)n_r - (v^i+v^f)n_\theta - en_r$$

The speed of the tread deformation at the contact patch is derived as $$\dot{\varepsilon} = (\dot{w}_T^f - \dot{w}^f - \Omega(v_T^i+v_T^f-v^i-v^f))n_r + (\dot{v}_T^f - \dot{v}^f + \Omega(w_T^i+w_T^f-w^i-w^f))n_\theta \quad (18)$$

At the contact patch, the following conditions must be satisfied:

$$w_T^i = w^i, \; v_T^i = v^i, \quad (19)$$

$$w_T^i + w_T^f = -w_c, \; v_T^i + v_T^f = -v_c$$

where $-w_c$ and $-v_c$ are respectively the tire ring displacements at the contact patch in the radial and the tangential directions due to the static load. The speed of the contact patch displacement can be neglected. Therefore, the radial and tangential deformations of the tread at the contact patch can be derived as $$\epsilon_r = -w^f - w^i - w_c, \; \epsilon_\theta = -v^f - v^i - v_c, \quad (20)$$

and the speed of the deformation:

$$\dot{\epsilon}_r = -\dot{w}^f - \Omega(-v_c - v^i - v^f), \; \dot{\epsilon}_\theta = -\dot{v}^f + \Omega(-w_c - w^i - w^f). \quad (21)$$

In this case, the radial and tangential forces acting on the tire ring at the contact patch are given by $$Q_w = -k_r(w^f + w^{i+w}_c) + c_r\Omega(v^f + v^i + v_c) - c_r\dot{w}^f, \quad (22)$$

$$Q_v = k_\theta(v^f + v^i + v_c) - c_\theta\Omega(w^f + w^i + w_c) - c_\theta\dot{v}^f$$

where $k_\theta$ and $k_r$ respectively represent the tangential and radial stiffness of the tread, and $c_\theta$ and $c_r$ respectively represent the tangential and radial damping of the tread. If the damping is negligibly small, the above equations are simplified to $$Q_w = -k_r(w^f + w^i + w_c). \quad (23)$$

$$Q_v = -k_\theta(v^f + v^i + v_c)$$

Since the contact patch is moving along the tire with speed $-\Omega$, the external forces can be characterized as $$q_w = Q_w\delta(\theta - (\phi_0 - \Omega t)), \quad (24)$$

$$q_v = Q_{hd\,v}\delta(\theta - (\phi_0 - \Omega t))$$

where $\phi_0$ is the angle which locates any point on the contact patch relative to the x axis at time t=0. $\delta$ is the Dirac delta function.

Explanation will now be provided for formulation of tire spindle forces. In rotating coordinate system, by neglecting the tire damping, the spindle force is derived as $$f_x = R\int_0^{2\pi}(k_w w^f \cos\theta - k_v v^f \sin\theta)d\theta. \quad (25)$$

$$f_z = R\int_0^{2\pi}(k_w w^f \sin\theta + k_v v^f \cos\theta)d\theta$$

If the tire ring is in-extensible, using equation (7), the above equation can be simplified as $$f_x = R\int_0^{2\pi}\left(-k_w \frac{\partial v^f}{\partial \theta}\cos\theta - k_v v^f \sin\theta\right)d\theta. \quad (26)$$

$$f_z = R\int_0^{2\pi}\left(-k_w \frac{\partial v^f}{\partial \theta}\sin\theta + k_v v^f \cos\theta\right)d\theta$$

Express the tire ring deformation in the form of Fourier Series:

$$v^f = \frac{A_0(t)}{2\pi} + \frac{1}{\pi}\sum_{n=1}^{\infty}(A_n(t)\cos(n\theta) + B_n(t)\sin(n\theta)). \quad (27)$$

$$\frac{\partial v^f}{\partial \theta} = \frac{1}{\pi}\sum_{n=1}^{\infty}n(-A_n(t)\sin(n\theta) + B_n(t)\cos(n\theta))$$

Substituting the above expressions into equations (26) gives $$f_x = R(k_w + k_v)B_1(t). \quad (28)$$

$$f_z = -R(k_w + k_v)A_1(t)$$

It is seen that $A_0$, $A_n$, and $B_n$ (n>1) all disappeared in the spindle force. The above equation can be expressed in the matrix form:

$$\begin{Bmatrix} f_x \\ f_z \end{Bmatrix} = R(k_w + k_v)\begin{bmatrix} 0 & 1 \\ -1 & 0 \end{bmatrix}\begin{Bmatrix} A_1(t) \\ B_1(t) \end{Bmatrix}. \quad (29)$$

Now, the spindle forces can be transformed into the fixed coordinates:

$$\begin{Bmatrix} f_{x^*} \\ f_{z^*} \end{Bmatrix} = \begin{bmatrix} \cos(\Omega t) & -\sin(\Omega t) \\ \sin(\Omega t) & \cos(\Omega t) \end{bmatrix}\begin{Bmatrix} f_x \\ f_z \end{Bmatrix}. \quad (30)$$

Solutions for the tire spindle forces induced by tire non-uniformity attributes can be obtained through the following steps. First, the tire initial radial run out, mass uneven distribution, and/or stiffness uneven distribution are used as inputs to solve equations (13) for the free spin response, $w^i$ and $v^i$. Next, the free spin solution together with the boundary conditions at the contact patch given by equations (22) are used as inputs to solve equations (14) for the final state deformation, $w^f$ and $v^f$, in the form of equation (27). Finally, $A_1$ and $B_1$ are substituted from the final state deformation into equation (30) to obtain the tire non-uniform spindle forces.

Examples are now presented to explain the transfer from radial run out (RRO) at the contact patch of a tire to the forces at the wheel center. In the following examples, an assumption is made that the non-uniformity comes from initial RRO only.

Figure 3:
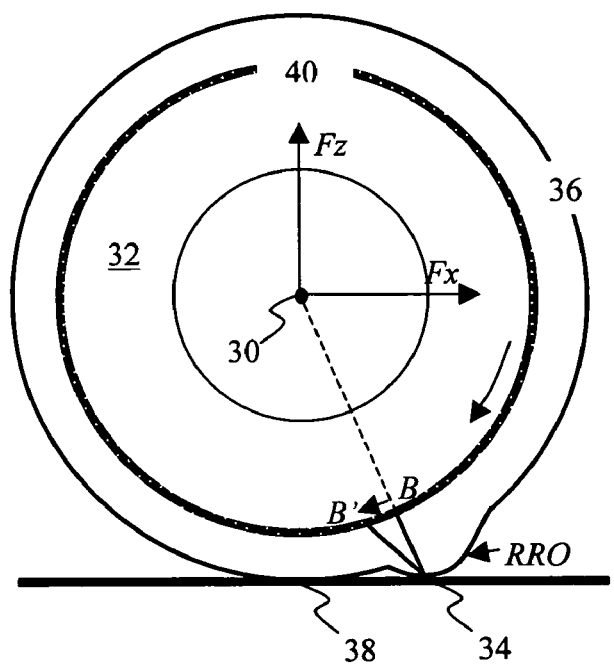
FIG. 3 provides an exemplary graphical illustration of a mechanism of tangential force variation (Fx) generation in accordance with aspects of the present subject matter.

Referring to FIG. 3, when RRO passes the contact patch, both the Fz (or in other words, radial force variation (RFV)) and Fx (or in other words, tangential force variation (TFV)) could be generated at tire spindle 30. Assume a rolling tire 32 has an RRO with point 34 on the tread 36 barely touching the ground. At this instance, the contact patch 38 does not generate Fx at the spindle. Once it touches the road surface, velocity of the point 34 equals zero (or equals the speed of the road surface). At this time, the belt 40 is still moving/ rotating, resulting in a shear deformation as indicated by BB' in FIG. 3. This shear deformation could generate Fx. At low speed, however, since the tire 32 is free to rotate about its spindle 30, the shear deformation BB' will not generate Fx. At high speed, especially when the rotational mode is excited, BB' could induce a significant amount of Fx.

Figure 4:
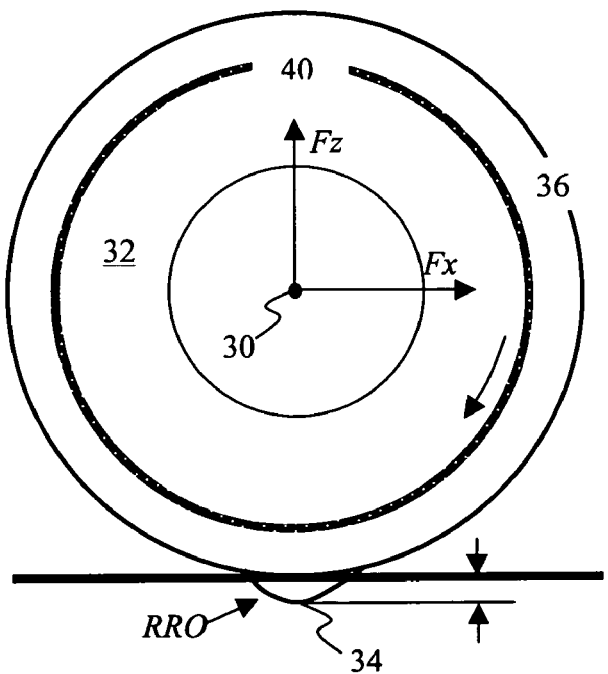
FIG. 4 provides an exemplary graphical illustration of a mechanism of radial force variation (Fz) generation in accordance with aspects of the present subject matter.
Figure 6:
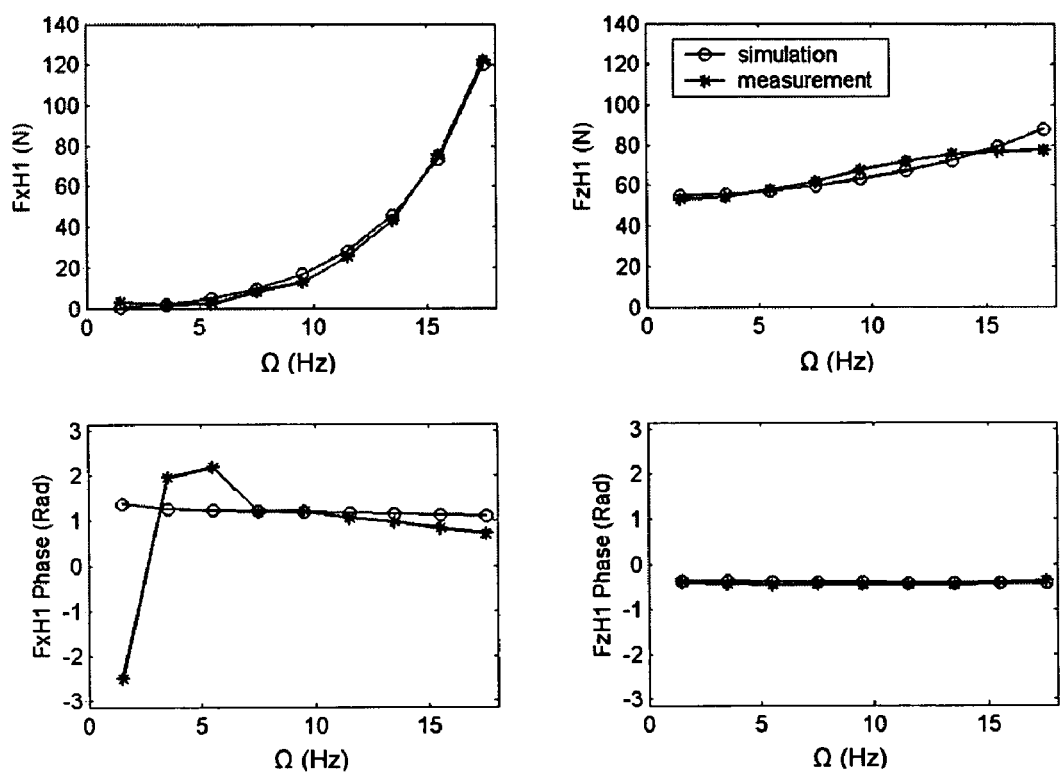
FIG. 6 provides respective exemplary graphical illustrations comparing measurement and simulation results in accordance with aspects of the present subject matter.

The mechanism of Fz generation from RRO is now explained with reference to FIG. 4. When RRO at point 34 passes the contact patch, RRO will be compressed (in addition to the nominal deformation due to the loading) and therefore Fz will be created. At low speed, since the tire spindle 30 is restricted from moving in the Z direction, the force used to compress RRO will be directly transferred to the wheel center and becomes Fz. At high speed, the vertical vibration mode could be excited by RRO, and therefore, a high level of Fz could be obtained.

The transfer function from RRO to Fz as will be referred to hereafter as DKz and the transfer function from RRO to Fx as DKx. A typical example of such transfer functions versus frequency is plotted in FIGS. 5A and 5B.

The peaks in the two respective curves of FIGS. 5A and 5B represent the locations of the resonant frequencies of an exemplary tire. At the zero excitation frequency (corresponding to a zero rotating speed), DKx is zero (due to the pinned condition at the tire spindle, i.e., the tire is free to rotate) while DKz is not (the tire spindle is restricted from moving in Z direction). This means that, at very low speed, Fx will always be very small no matter how large the RRO is. On the other hand, DKz is around 200N/mm at zero speed. Therefore, Fz can be very large if RRO is not small at a speed close to zero.

As a comparison of the above theory with experiment, the following example is provided with the exemplary tire parameters listed in Table 1 below.

TABLE 1

Tire Input Parameters

| Parameter | Symbol | Value | Unit |
|---|---|---|---|
| Tire dimension | | 205/60R16 | |
| Rim moment of inertia | $I_r$ | 2.5*0.371 | kgm$^2$ |
| Tire un-loaded radius | R | 0.326 | m |
| Tire summit linear mass density | $\rho A$ | 4.02 | kg/m |
| Inflation pressure | $p_0$ | 2.07*10$^5$ | N/m$^2$ |
| Tire summit width | b | 0.142 | m |
| Tire radial stiffness | $k_w$ | 7.20*10$^5$ | N/m$^2$ |
| Tire tangential stiffness | $k_v$ | 4.44*10$^5$ | N/m$^2$ |
| Tire summit radial stiffness | $k_r$ | 5.76*10$^6$ | N/m$^2$ |
| Tire summit tangential stiffness | $k_\theta$ | 3.55*10$^6$ | N/m$^2$ |
| Tire radial damping | $c_w$ | 68 | Ns/m$^2$ |
| Tire tangential damping | $c_v$ | 57 | Ns/m$^2$ |
| Tire tread radial damping | $C_r$ | 2887 | Ns/m$^2$ |
| Tire tread tangential damping | $C_\theta$ | 1511 | Ns/m$^2$ |
| Tire loaded deformation | $w_c$ | 0.026 | m |

In the present example, the tire non-uniformity attribute contains the first harmonic radial runout and the mass uneven distribution. The respective magnitudes (in Newtons) and the phase angles (in radians) for both FxH1 and FzH1 (H1 represents the first harmonic) obtained from simulation and from measurement are presented in FIG. 6. It is seen that, except the phase of FxH1 at low speeds, the simulated results match the measurements very well. At lower speeds (e.g., below 6 Hz), FxH1 is too small to be measured accurately by the uniformity machine.

Figure 7A:
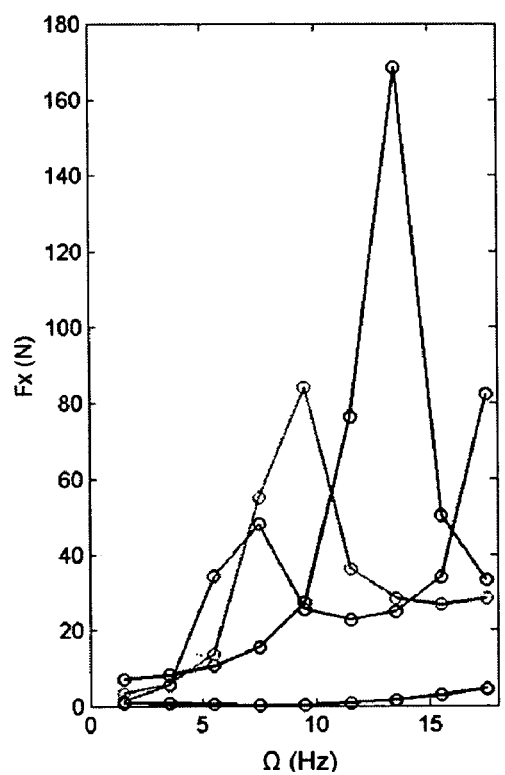
FIGS. 7A and 7B provide respective exemplary graphical illustrations of Fx and Fz generation for various harmonics by a one percent tire stiffness variation in accordance with aspects of the presently disclosed technology.
Figure 7B:
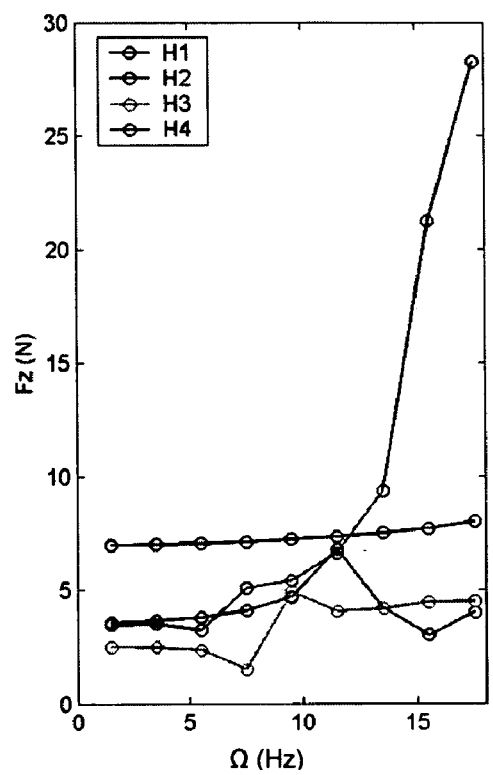

An example of stiffness variation's effect on tire spindle non-uniformity forces is now presented with respect to FIGS. 7A and 7B. Assume that a given tire's radial stiffness has 1% variation in its first four harmonics. Further assume that such tire is perfectly round with mass evenly distributed and the radial runout generated by the stiffness variation at high speed is negligibly small. In this situation, non-uniform forces will be generated at the tire spindle when the tire is loaded against the road wheel with a 26 mm deformation and rotated at a certain speed. Fx and Fz versus speed (Hz) for each of the first four harmonics are graphically illustrated in respective FIGS. 7A and 7B. It is seen that the stiffness variation has significant effects on higher harmonics of Fx, especially in the resonant frequency range. Also, at low speed, Fx is not zero.

As illustrated and described above in FIGS. 5–7, both RRO and stiffness variation will generate Fx (corresponding to tangential force variation) and Fz (corresponding to radial force variation), especially in the vicinity of the tire resonant frequency. Even a very small amount of RRO or stiffness variation can generate very high levels of forces.

If, however, the effects of RRO and stiffness variation can be arranged in such a way that they are out of phase, then the non-uniformity forces can be dramatically reduced (or, in other words, compensated). As an example of non-uniformity compensation, refer to FIGS. 8A and 8B in considering a tire with the same parameters listed in Table 1 and having a first harmonic radial run out (RROH1) of 0.70 mm at 0 degrees, which generates non-uniformity forces. It is seen in the dashed-line curve of FIG. 8A that at about 17.5 Hz, FxH1 (tangential force variation, first harmonic) is very high. Now, if a first harmonic radial stiffness variation with a magnitude of about 4.0% is located at 180 degrees and the spindle forces are calculated, FxH1 will be reduced as shown by the solid-line curve in FIG. 8A. This demonstrates that Fx can be minimized at relatively higher speeds through RRO and stiffness variation compensation. Fz can also be improved in a similar fashion for both low and high speeds, as illustrated in FIG. 8B.

Figure 8A:
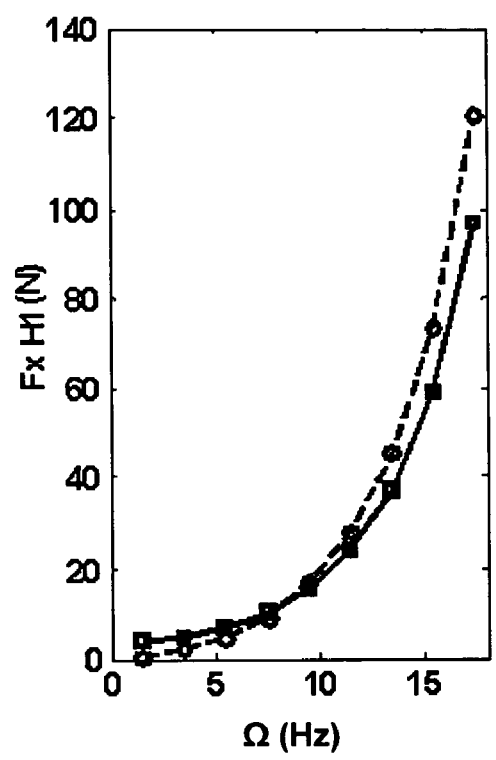
FIGS. 8A and 8B provide respective graphical illustrations of relative exemplary improvement in first harmonic force variations Fx and Fz when compensations between radial run out and radial stiffness variation are effected in accordance with the present subject matter.
Figure 8B:
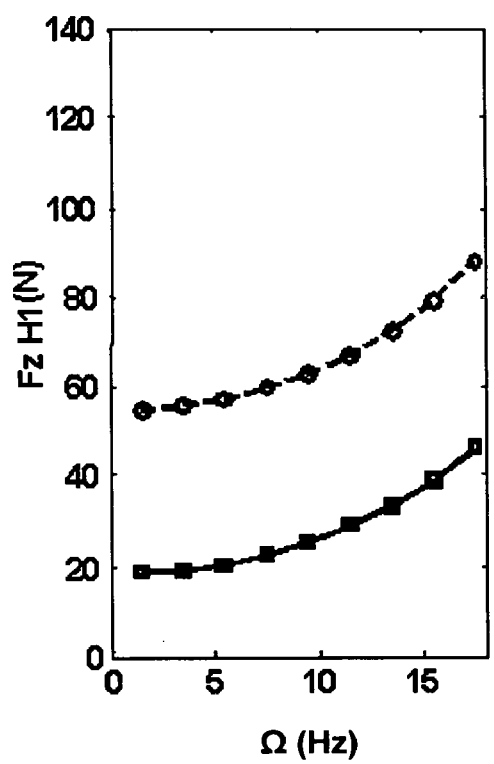
Figure 8C:
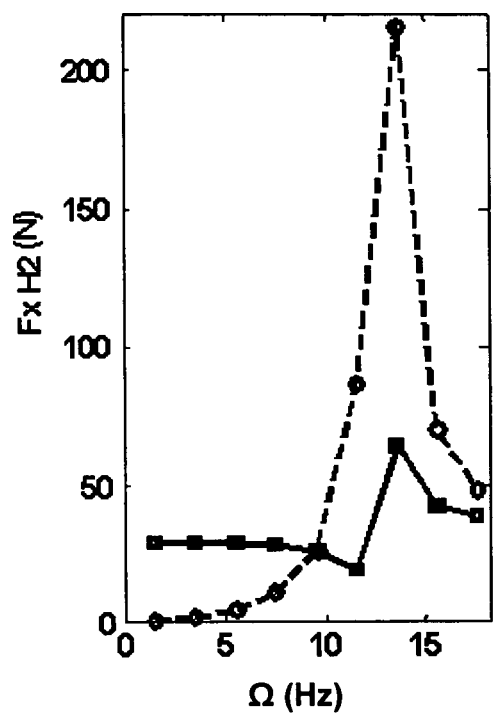
FIGS. 8C and 8D provide respective graphical illustrations of relative exemplary improvement in second harmonic force variations Fx and Fz when compensations between radial run out and tangential stiffness variations are effected in accordance with the present subject matter.
Figure 8D:
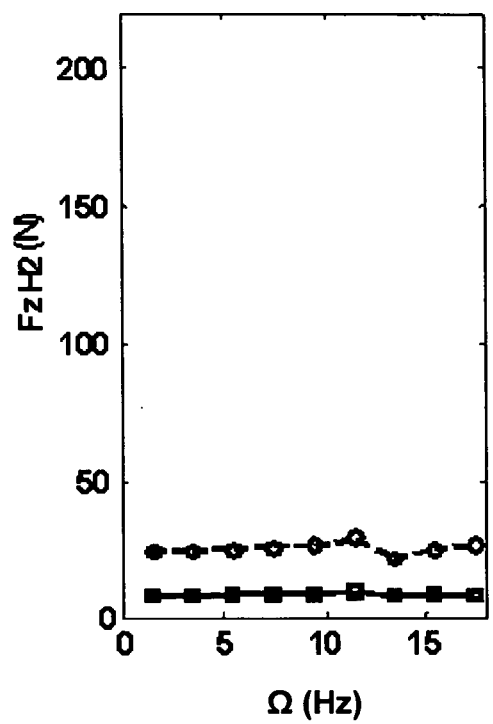

Referring now to FIGS. 8C and 8D, another example is presented to illustrate the potential improvement in tire non-uniformity forces by compensation between radial dun out and stiffness variation. Again consider a tire with the same-parameters listed in Table 1, this time having a second harmonic radial run out (RROH2) of 0.208 mm at 0 or 180 degrees, which generates non-uniformity forces. It is seen in the dashed-line curve of FIG. 8C that at about 13.5 Hz, FxH2 (tangential force variation, second harmonic) is very high. Now, if a second harmonic tangential stiffness variation with a magnitude of about 4.0% is located at ±90 degrees and the spindle forces are calculated, FxH2 will be reduced at higher frequencies, especially resonant frequencies, as shown by the solid-line curve in FIG. 8C. This demonstrates that Fx can be minimized at relatively higher speeds through RRO and stiffness variation compensation. Fz can also be improved at both low and high relative speeds, as illustrated in FIG. 8D.

In the above examples of FIGS. 8A–8D, examples are presented of how tire non-uniformity forces (i.e., radial force variation (Fz) and tangential force variation (Fx)) can be reduced with compensation between radial run out and various selected types of stiffness variation. It was presented earlier that a variety of types of tire stiffness, including but not limited to radial stiffness, tangential stiffness, extensional stiffness, and bending stiffness, can all affect the level of tire spindle forces. When compensation between radial run out and stiffness variation is effected, the stiffness variation can be any one of the possible types of stiffness variation. For example, FIGS. 8A and 8B illustrate how the effects of radial stiffness variation can be oriented to be out of phase with the effects of radial run out to improve tire non-uniformity forces. FIGS. 8C and 8D illustrate similar principles with radial run out and tangential stiffness variation compensation. It should be appreciated that such compensation in accordance with the presently disclosed technology is not limited to one particular type of stiffness variation. It may sometimes be more practical to implement one type of stiffness variation than many. In that case, the type of stiffness variation that is the most practical and efficient to implement is the one for which compensation levels will be determined and/or implemented.

The above mathematical analysis and numerical examples provide a basis for methods of respectively characterizing and manufacturing tires in accordance with the present subject matter. Initially, it should be appreciated that many various processes, as known in the art, are employed in the construction of an individual tire. Such tire building processes may, for example, include applying various layers of rubber compound and/or other suitable materials to form the tire carcass, providing a tire belt portion and a tread portion to form the tire summit block, curing the finished green tire, etc. Such processes are represented as $42a, 42b, \ldots, 42n$ in FIG. 9 and combine to form exemplary tire 44. It should be appreciated that a batch of multiple tires may be constructed from one iteration of the various processes $42a$ through $42n$, respectively.

Figure 9:
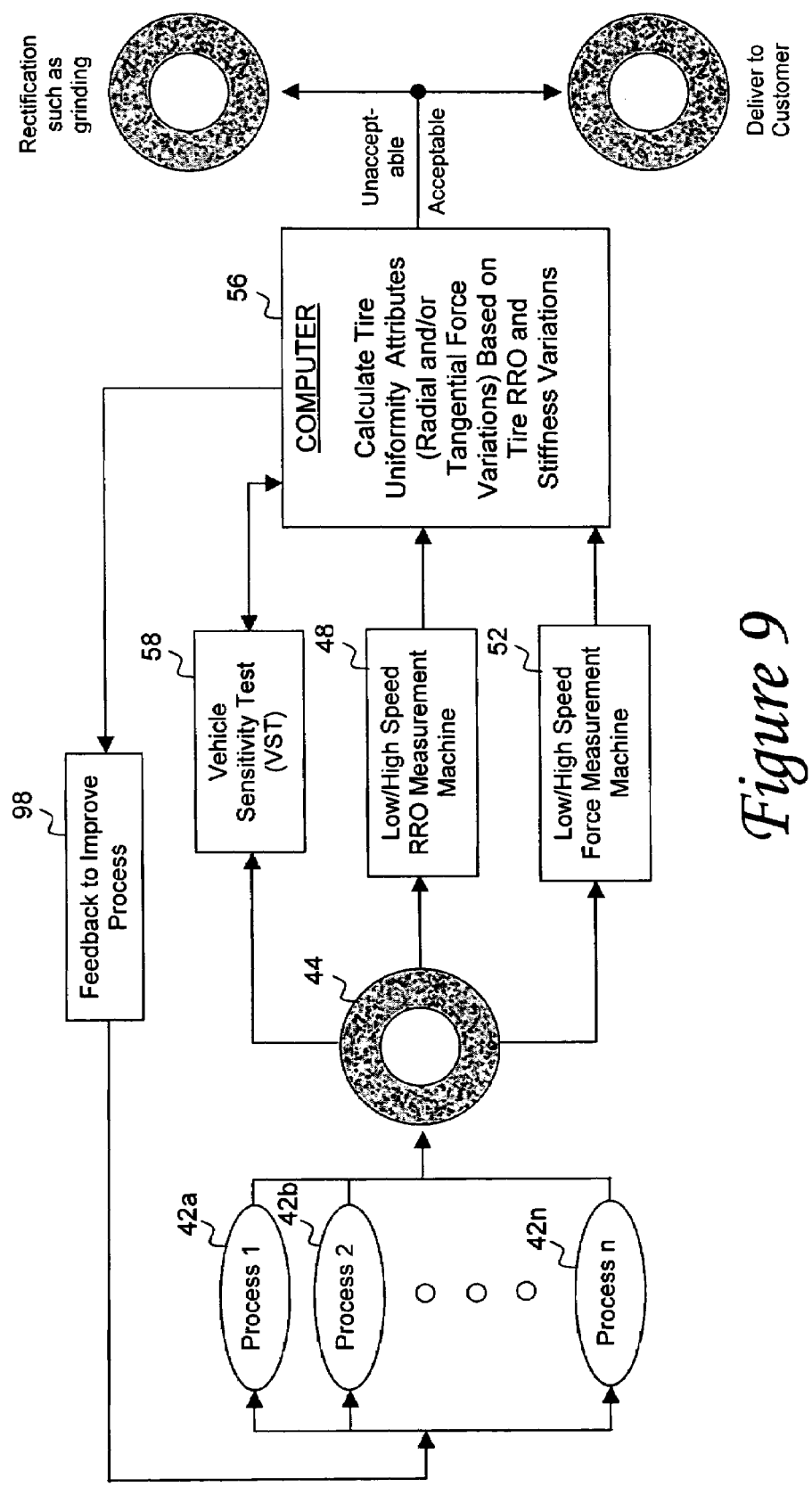
FIG. 9 illustrates aspects of an exemplary tire measurement and analysis system in accordance with the present subject matter.
Figure 10:
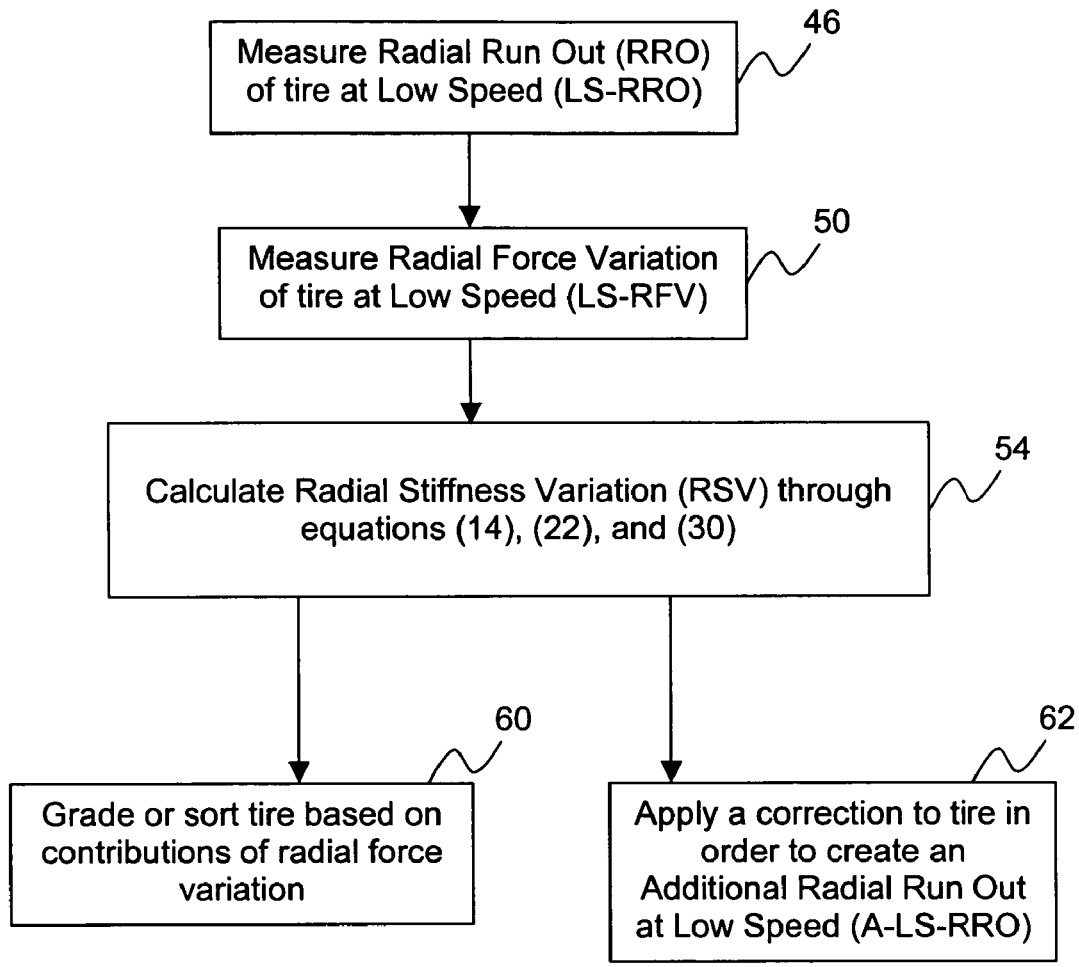
FIG. 10 provides a block diagram of an exemplary method for characterizing low speed radial force variation aspects of tire uniformity in accordance with the present subject matter.

Referring now to FIG. 10, exemplary steps for a method of characterizing tires, and particularly for characterizing tire low-speed radial force variation, are presented. A tire may be made according to the multiple processes referenced in FIG. 9. After a tire is provided, a plurality of tire measurements may be established, such as the type of tire measurements set forth in previously mentioned Table 1. Such parameters may include, for example, the tire radius, tire width, tire summit mass, tire pressure, tire radial stiffness, tire tangential stiffness, tire summit radial stiffness, tire summit tangential stiffness, tire radial damping, tire tangential damping, tire tread radial damping, tire tread tangential damping, and tire loaded deformation. Such parameters may be obtained by a tire property measurement apparatus, as are well known to those in the art, or may alternatively be established prior to the subject methodology and entered as known variables for processing in subsequent computer analysis.

A first step 46 in the tire characterization method of FIG. 10 is to measure the radial run out of a tire at low speed. Low speed radial run out (referred to herein as LS-RRO) may be measured by positioning a tire on a mounting fixture (typically having similar qualities to a tire rim or other rigid disk) of a radial run out measurement apparatus 48 (see FIG. 9). Examples of some such RRO measurement apparatuses are provided in U.S. Pat. No. 5,396,438 (Oblizajek) and U.S. Pat. No. 5,345,867 (Sube et al.), which are both incorporated herein by reference for all purposes. An RRO measurement apparatus is able to identify and maintain a reference point on a tire while it is rotating at the desired speeds. The tire is then rotated at a "low speed", which may correspond in some embodiments of the present technology to about 180 rotations per minute (RPM) or about 3 Hz.

A next step 50 in the exemplary methodology of FIG. 10 involves measuring the radial force variation of the provided tire at low speed. Low speed radial force variation (referred to herein as LS-RFV) may be obtained by force measurement machine 52 (see FIG. 9), which may for example correspond to testing apparatus 114 and/or apparatus 132 or others as disclosed in U.S. Pat. No. 5,396,438. Alternative low speed measurement apparatuses, as are well known in the art of tire manufacturing and testing, may also be employed. It should be appreciated that in some embodiments of the present subject matter, all low speed and high speed radial run out and force measurements may be obtained via a single measurement machine if it is designed for this purpose.

Referring still to FIG. 10, once LS-RRO and LS-RFV measurements are obtained in respective steps 46 and 50, equations (14), (22), and (30) can be applied to calculate radial stiffness variation (RSV), as indicated in step 54.

Referring again to FIG. 9, the calculations in step 54 may be performed by a computer 56, which may correspond to any type of processor, microcontroller, or other data analyzer. The measurements obtained at respective measurement machines 48 and 52 may be relayed to computer 56, at which point any desired level of data analysis can be effected. A vehicle sensitivity test (VST) 58 may also be employed and coupled to computer 56. VST 58 is a measurement assessing vehicle vibrations caused by tire non-uniformity attributes, such as radial run out and stiffness variations, such as described in additional detail in M. G. Holcombe and R. G. Altman, "A Method for Determining Tire and Wheel Uniformity Needs Using Ride Rating Simulations," SAE 880579, 1998. Normally, high levels of tire non-uniformity generate noticeable amounts of vehicle vibrations making vehicle riding potentially uncomfortable. VST 58 may be performed objectively or subjectively. If objectively, the vehicle is instrumented at locations such as the steering wheel, driver's seat, and/or floor of the vehicle so that vibrations can be measured. If subjectively, a professional driver is used to evaluate the severity of the vibration. By doing so, the relationship between vehicle vibration and tire non-uniformity can be established, from which a limit can be set on selected tire non-uniformity attributes so that a good riding can be guaranteed if the tire's non-uniformity level is below such limit. The limit may then be programmed at computer 56.

Referring to FIGS. 9 and 10, once computer 56 calculates the respective radial stiffness variation and radial run out contributions of radial force variation in step 54, the tire may be further evaluated in a variety of different fashions. An exemplary further evaluation process may involve tire sorting or grading, as in exemplary step 60. Limitations may be established to set an upper limit on acceptable levels of low speed radial force variations in a tire, such limitations possibly being dependent on a particular type of tested tire and/or type of vehicle for which the tire is intended to be used with. If the tire has low speed radial force variation levels beyond the established limit, then the tire may be sorted into a group that is rejected or returned to manufacturing for subsequent modification. If the tire non-uniformity characteristics are within limits, the tire may be sorted into a group that is acceptable for delivering to a customer. Another exemplary evaluation process corresponds to "grading" the tire into one of a plurality of established categories. Each category may be defined based on certain levels of tire non-uniformity forces and the effect on a particular type of tire and/or intended type of vehicle, application or location use. It should be appreciated that specific such limitations and grading categories are highly dependent on various parameters as desired by a tire manufacturer and/or customer and thus particular examples of such are not set forth herein.

Referring still to FIG. 10, yet another exemplary step 62 in a process for characterizing low speed radial force variation for a tire, is to subject the tire to a physical tire modification process. Exemplary modification processes correspond to grinding and/or adding extra rubber mass to the tire at particular determined locations in accordance with tire grinding or mass adding processes as are understood by one of skill in the art of tire manufacturing. Exemplary aspects of tire grinding and tire uniformity correction machines (UCMs) that may be utilized in accordance with features of the present invention are disclosed in U.S. Pat. No. 6,139,401 (Dunn et al.) and U.S. Pat. No. 6,086,452 (Lipczynski et al.), which are incorporated by reference herein for all purposes.

In further accordance with the step 62 of FIG. 10, it may be desired to apply modification to a tire in order to create an additional radial run out at low speed (referred to as an A-LS-RRO). The A-LS-RRO is preferably such that the effects of the total RRO represented by the vectorial sum of the initial RRO (LS-RRO) and the additional RRO (A-LS-RRO) is out of phase with the effects of tire radial stiffness variation (RSV) for one or several harmonics of the Fourier decompositions. For example, for the first RRO harmonic (RRO-H1), the maximum point angle of LS-RRO+A-LS-RRO would preferably be about 180 degrees away from the maximum point angle of RSV for H1. For the second RRO harmonic (RRO-H2), the maximum point angle of LS-RRO+A-LS-RRO would preferably be about 90 degrees away from the maximum point angle of RSV for H2. Creating an additional radial run out at low speed may be effected by a physical tire modification process such as grinding or adding mass to a tire, or may alternatively be effected by signature compensation or process modifications to one or more steps of the original tire building process exemplified by processes 42a, 42b, . . . , 42n of FIG. 9.

It should be appreciated with respect to FIG. 10 as well as the remaining figures and corresponding descriptions that although features for compensation between radial runout and radial stiffness variation are presented, the disclosed steps and features should not be limited to radial stiffness variation. Other stiffness variations, such as the tangential stiffness variation, tire belt extensional stiffness variation and/or bending stiffness variation may also be calculated and compensated for in accordance with the present subject matter. As such, the type of stiffness variation for which compensation with radial run out is to be effected may be any preselected type from the examples listed above.

Figure 11:
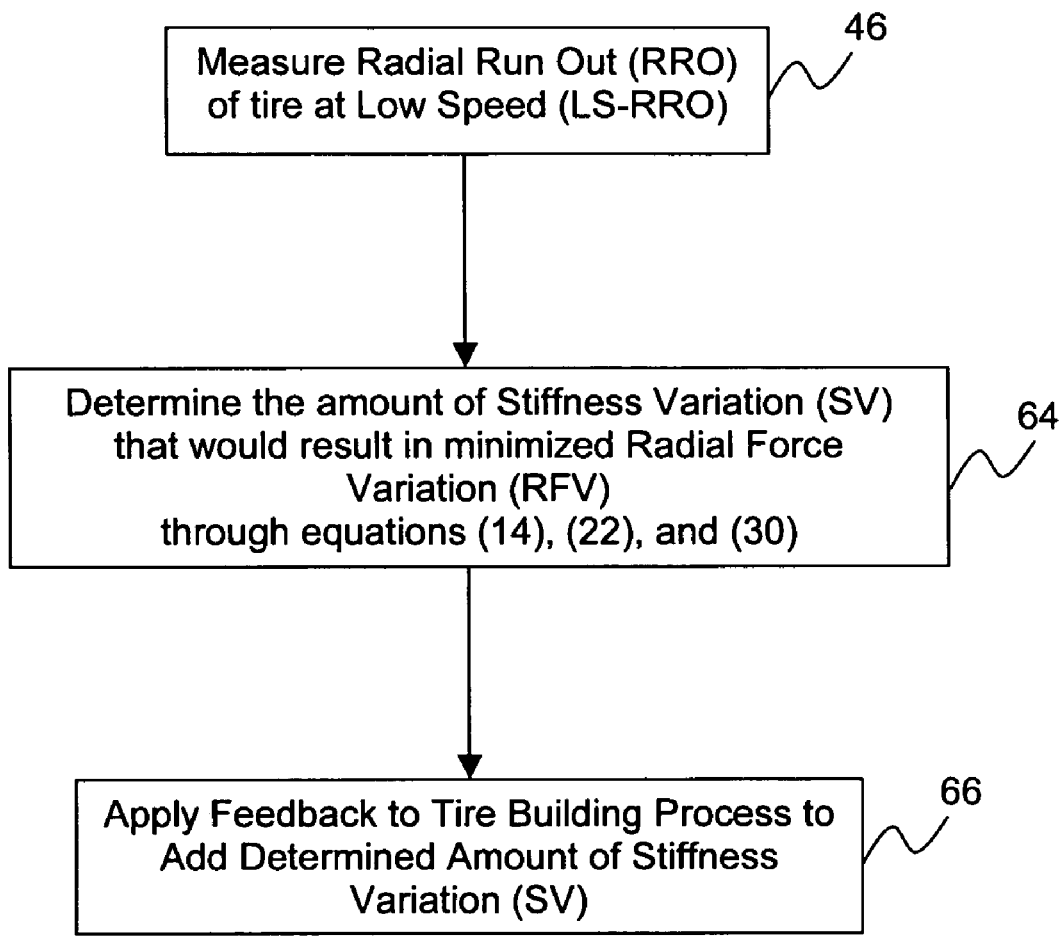
FIG. 11 provides a block diagram of an exemplary method for optimizing exemplary aspects of a tire building process based on characterization of low speed radial force variation.

FIG. 10 as discussed above presents exemplary steps and features for characterizing and compensating for low speed radial force variations in a tire by creating additional radial runout in a tire. FIG. 11 now presents alternative steps and features for compensating low speed radial force variations by creating additional stiffness variation in a tire. Some aspects of the exemplary methodology presented in FIG. 11 are similar to those previously discussed with reference to FIG. 10 and like reference numbers are used to indicate such instances.

Referring now to FIG. 11, an exemplary method for compensating tire non-uniformity, more particularly with regard to compensation of low speed radial force variation is disclosed. A first exemplary step 46 in such method corresponds to measuring the radial runout of a tire at low speed, in a manner such as described previously with respect to FIG. 10. The RRO measurement obtained in step 46 may also in some embodiments be performed at a low pressure that still ensures correct seating of the tire (for example, a pressure of around 0.8 bar) in order to capture only the initial RRO.

Referring still to FIG. 11, a second exemplary step 64 corresponds to determining the amount of radial stiffness variation that would result in a minimized amount of radial force variation at the tire-wheel center. As previously mentioned, a stiffness variation (RSV) value resulting in a zero radial force variation can be obtained through equations (14), (22), and (30). In other embodiments, the same equations can be used to determine a different type of stiffness variation than RSV. The determination of values in step 64 may be effected by computer 56 of FIG. 9 as previously described. A final step 66 in the exemplary method of FIG. 11 is to create an additional stiffness variation (e.g., RSV) as determined in step 64 that would compensate for the RRO of the tire as measured in step 46. The creation of an additional stiffness variation may be effected by signature compensation or process modifications to one or more steps of the original tire building process exemplified by processes 42a, 42b, . . . , 42n of FIG. 9. Additional details concerning the intentional creation of stiffness variation in the tire building process such as may be implemented in exemplary step 66 are disclosed in U.S. Pat. No. 6,606,902, which is incorporated by reference herein for all purposes.

Figure 12:
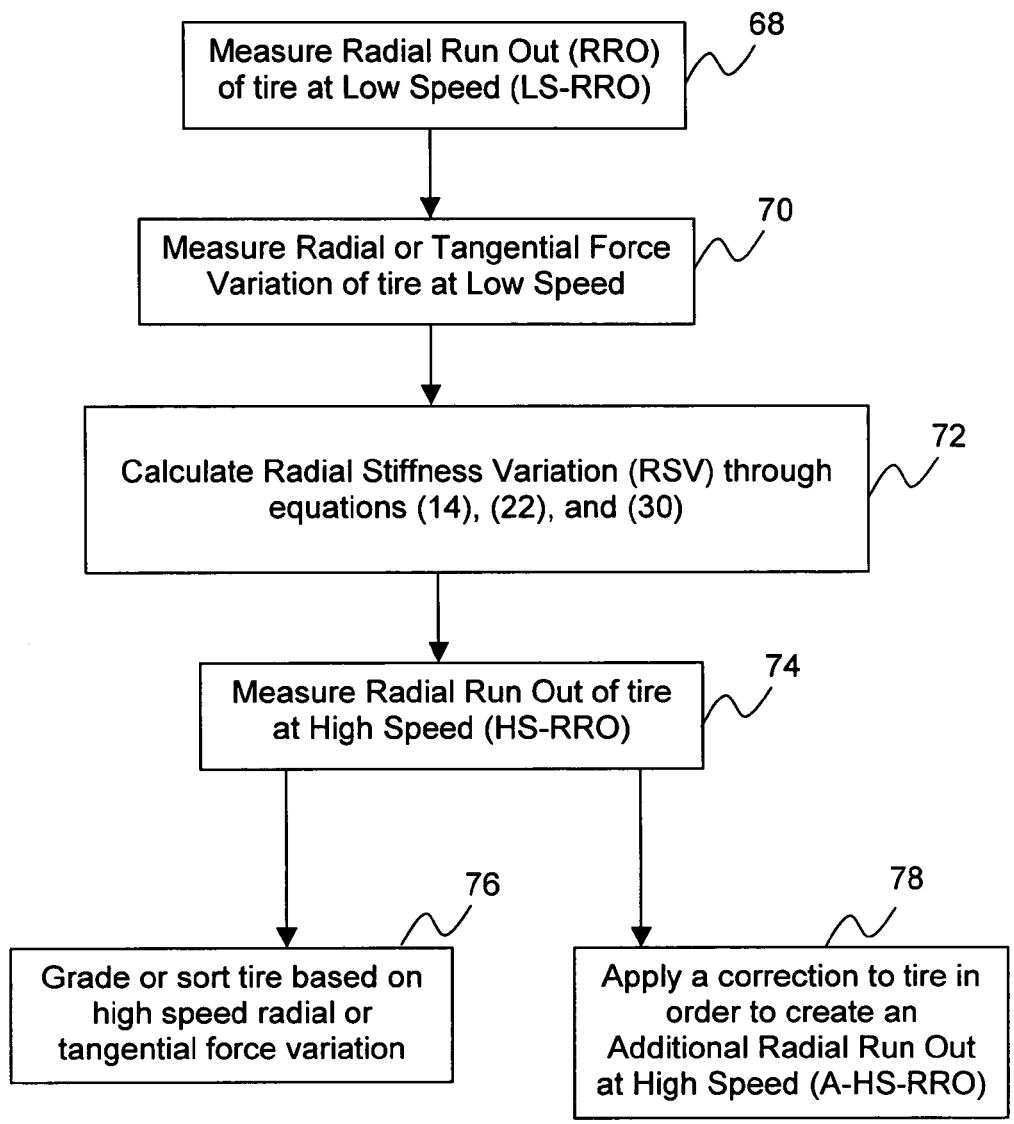
FIG. 12 provides a block diagram of an exemplary method for characterizing high speed radial or tangential force variation aspects of tire uniformity in accordance with the present subject matter.

Referring now to FIG. 12, exemplary steps for a method of characterizing tires, and particularly for characterizing tire high-speed radial or tangential force variation, is presented. The method represented in FIG. 12 is similar in aspects to the method described with respect to FIG. 10, and it should be appreciated that implementation of such steps via the tire measurement and analysis system depicted in FIG. 9 equally applies to the exemplary steps of the process represented by FIG. 12.

A first step 68 in the tire characterization method of FIG. 12 is to measure the radial run out of a tire at low speed (LS-RRO). A next step 70 in the exemplary methodology of FIG. 12 involves measuring the radial and/or tangential force variation of the provided tire at low speed (LS-RFV/LS-TFV). Once LS-RRO and LS-RFV/LS-TFV measurements are obtained in respective steps 68 and 70, equations (14), (22), and (30) can be applied to calculate radial stiffness variation (RSV), as indicated in step 72. A subsequent step 74 in characterizing high speed radial or tangential force variation is to measure the radial run out of a tire at high speed. Exemplary "high" speeds for obtaining such high speed radial run out (HS-RRO) measurement and other high speed measurements disclosed herein may correspond to speeds of at least about 300 rpm (about 5 Hz), and in some cases may be between about 1200–1800 rpm (20–30 Hz) or higher.

Referring still to FIG. 12, once the measurements and calculations are obtained in respective steps 68–74, the tire may be further evaluated in a variety of different fashions. An exemplary further evaluation process may involve tire sorting or grading, as in exemplary step 76. Limitations may be established to set an upper limit on acceptable levels of high speed radial or tangential force variations in a tire, such limitations possibly being dependent on a particular type of tested tire and/or type of vehicle for which the tire is intended to be used with. If the tire has high speed radial or tangential force variation levels beyond the established limit, then the tire may be sorted into a group that is rejected or returned to manufacturing for subsequent modification. If the tire high speed radial or tangential force variations are within limits, the tire may be sorted into a group that is acceptable for delivering to a customer. Another exemplary evaluation process corresponds to "grading" the tire into one of a plurality of established categories. Each category may be defined based on certain levels of tire non-uniformity forces and the effect on a particular type of tire and/or intended type of vehicle, application or location use. It should be appreciated that specific such limitations and grading categories are highly dependent on various parameters as desired by a tire manufacturer and/or customer and thus particular examples of such are not set forth herein.

Referring still to FIG. 12, yet another exemplary step 78 in a process for characterizing high speed radial or tangential force variation for a tire, is to subject the tire to a physical tire modification process. It may be desired to apply modification to a tire in order to create an additional radial run out at high speed (referred to as an A-HS-RRO). The A-HS-RRO is preferably such that the total RRO effects represented by the vectorial sum of the initial high speed RRO (HS-RRO) and the additional high speed RRO (A-HS-RRO) is out of phase with the tire radial stiffness variation (RSV) for one or several harmonics of the Fourier decompositions. For example, for the first RRO harmonic (RRO-H1), the maximum point angle of HS-RRO+A-HS-RRO would preferably be about 180 degrees away from the maximum point angle of RSV for H1. For the second RRO harmonic (RRO-H2), the maximum point angle of HS-RRO+A-HS-RRO would preferably be about 90 degrees away from the maximum point angle of RSV for H2. Creating an additional radial run out at high speed may be effected by a physical tire modification process such as grinding or adding mass to a tire, or may alternatively be effected by signature compensation or process modifications to one or more steps of the original tire building process exemplified by processes 42a, 42b, . . . , 42n of FIG. 9.

FIG. 12 as discussed above presents exemplary steps and features for characterizing and compensating for high speed radial or tangential force variations in a tire by creating additional radial runout in a tire. FIG. 13 now presents alternative steps and features for compensating high speed radial or tangential force variations in a tire by creating additional stiffness variation in a tire. Some aspects of the exemplary methodology presented in FIG. 13 are similar to those previously discussed with reference to FIG. 12 and like reference numbers are used to indicate such instances.

Referring now to FIG. 13, an exemplary method for compensating tire non-uniformity, more particularly with regard to compensation of high speed radial or tangential force variation is disclosed. A first exemplary step 74 in such method corresponds to measuring the radial runout of a tire at high speed, in a manner such as described previously with respect to FIG. 12. The RRO measurement obtained in step 74 may also in some embodiments be performed at a low pressure that still ensures correct seating of the tire (for example, a pressure of around 0.8 bar) in order to capture only the initial RRO (any effect of already present stiffness variation).

Referring still to FIG. 13, a second exemplary step 80 corresponds to determining the amount of stiffness variation that would result in a minimized amount of radial or tangential force variation at the tire-wheel center. As previously mentioned, a stiffness variation (SV) value resulting in a zero radial force variation can be determined from equations (14), (22), and (30). The determination of values in step 80 may be effected by computer 56 of FIG. 9 as previously described. A final step 82 in the exemplary method of FIG. 13 is to create an additional stiffness variation as determined in step 80 that would compensate for the RRO of the tire as measured in step 74. The creation of an additional stiffness variation may be effected by signature compensation or process modifications to one or more steps of the original tire building process exemplified by processes 42a, 42b, . . . , 42n of FIG. 9. Additional details concerning the intentional creation of stiffness variation in the tire building process such as may be implemented in exemplary step 82 are disclosed in U.S. Pat. No. 6,606,902, which is incorporated by reference herein for all purposes.

Exemplary tire uniformity protocols for characterizing low speed radial force variation and high speed radial or tangential force variation have been respectively presented with regard to FIGS. 10–13. Methods for improvement associated with such characterization protocols include such actions as grading or sorting tires, subjecting tires to physical modification processes such as grinding or adding rubber to the tire, or providing feedback to effect the tire building process itself. Additional aspects of this last class of tire characterization and associated tire improvement concerning steps for improving the actual tire manufacturing process are now presented with respect to FIGS. 14 and 15. As illustrated in FIG. 9, feedback modification 98 may be utilized to improve selected of the various processes 42a–42n, respectively, as are involved in manufacturing of tire 44. FIG. 14 depicts exemplary method steps for manufacturing tires based on characterization of tire low speed radial force variation, FIG. 15 depicts exemplary method steps for manufacturing tires based on characterization of tire high speed radial or tangential force variation.

The methods represented in FIGS. 14 and 15 are similar in aspects to the methods described above with respect to FIGS. 10–13, specifically in the type of measurements that are obtained in characterizing tire uniformity. As such, it should be appreciated that implementation of such steps via the tire measurement and analysis system depicted in FIG. 9, as originally discussed with reference to FIG. 10, equally applies to the exemplary steps of the processes depicted in FIGS. 14 and 15 respectively.

The protocols depicted in FIGS. 14 and 15, generally represent a process design of experiment on the different steps of the tire building process represented by processes 42a, . . . , 42n as represented in FIG. 9. One example of the type of design experiment utilized in such tire characterization method is a signature analysis. Signature analysis is a form of expert system that is specifically designed to assimilate clues associated with diagnostic data, such as isolated tire uniformity parameters, to fingerprint undesirable results in a tire manufacturing process. Statistical decision trees can help to discover patterns that associate a given undesirable result with a set of process conditions. Once associations are known they can be applied to new data through signature analysis to implicate likely process conditions that led to the undesirable manufacturing results.

Referring now to FIG. 14, a first step 100 in an exemplary tire manufacturing process based on characterization of tire low speed radial force variation is to build several sets of tires, with each set of tires having different combinations of reference physical angles of the different steps of the tire building process depicted in FIG. 10 as processes 42a, 42b, . . . , 42c. The different reference physical angles may correspond to overlap or variation locations for each of the different layers that are typically combined in a tire manufacturing process to form a tire carcass and summit block. A second step 102 in the method of FIG. 14 is to measure the radial run out at low speed (LS-RRO) for each tire in each set constructed in step 100. The low speed radial force variation (LS-RFV) for each tire in each set constructed in step 100 is also obtained in step 104. Once LS-RRO and LS-RFV measurements are obtained in respective steps 102 and 104, equations (14), (22) and (32) are applied in step 106 to derive the radial stiffness variation (RSV) for each tire in each set.

Referring still to FIG. 14, a next step 108 in the exemplary manufacturing process based on characterization of tire low speed radial force variation involves applying a signature analysis statistical method, and estimating selected parameters for each modeled step in the tire manufacturing process that the experiment allows to isolate. Such selected parameters may include a LS-RRO signature and a radial stiffness variation (RSV) signature. Based on the results of the signature analysis statistical method performed at step 108, a subsequent step 110 may be employed to optimize the tire building process. Process optimization may be effected, for example, by finding the combination of relative angles of the different steps of the tire manufacturing process such that the sum of the LS-RRO signatures and the sum of RSV signatures are out of phase for one or several harmonics.

As previously mentioned, although FIG. 14 above and also FIG. 15 as discussed below both illustrate an example of compensation between radial run out and radial stiffness variation, the disclosed steps and features should not be limited to radial stiffness variation. Other stiffness variations, such as the tangential stiffness variation, tire belt extensional stiffness variation and/or bending stiffness variation may also be calculated and compensated for in accordance with the present subject matter. As such, the type of stiffness variation for which compensation with radial run out is to be effected may be any preselected type from the examples listed above.

Referring now to FIG. 15, a first step 112 in an exemplary tire manufacturing process based on characterization of tire high speed radial or tangential force variation is to build several sets of tires, with each set of tires having different combinations of reference physical angles of the different steps of the tire building process depicted in FIG. 9 as processes 42a, 42b, . . . , 42c. The different reference physical angles may correspond to overlap or variation locations for each of the different layers that are typically combined in a tire manufacturing process to form a tire carcass and summit block. A second step 114 in the method of FIG. 15 is to measure the radial run out at low speed (LS-RRO) for each tire in each set constructed in step 112. The low speed radial force variation (LS-RFV) for each tire in each set constructed in step 112 is also obtained in step 116. Once LS-RRO and LS-RFV measurements are obtained in respective steps 114 and 116, equations (14), (22), and (30) are applied in step 118 to calculate the radial stiffness variation (RSV) for each tire in each set.

Referring still to FIG. 15, a next step 120 in the exemplary manufacturing process based on characterization of tire high speed radial or tangential force variation involves measuring radial run out for high speed (HS-RRO) for each tire in each set manufactured in step 112. Thereafter, an exemplary step 122 involves applying a signature analysis statistical method, and estimating selected parameters for each modeled step in the tire manufacturing process that the experiment allows to isolate. Such selected parameters may include a HS-RRO signature and a radial stiffness variation (RSV) signature. Based on the results of the signature analysis statistical method performed at step 122, a subsequent step 124 may be employed to optimize the tire building process. Process optimization may be effected, for example, by finding the combination of relative angles of the different steps of the tire manufacturing process such that the sum of the HS-RRO signatures and the sum of RSV signatures are out of phase for one or several harmonics.

It should be noted that the compensation for high speed radial or tangential force variation may also be achieved through the steps described in FIG. 14.

It should also be noted that other stiffness variations, such as the tangential stiffness variation and tire belt extensional stiffness variation, may affect tire radial or tangential force variations. In this situation, compensations for the non-uniformity forces can be achieved following the same principles as described herein.

Selected combinations of the aforementioned aspects of the disclosed technology correspond to a plurality of different embodiments of the present subject matter. It should be noted that each of the exemplary embodiments presented and discussed herein should not insinuate limitations of the present subject matter. Features or steps illustrated or described as part of one embodiments may be used in combination with aspects of another embodiment to yield still further embodiments. Additionally, certain features may be interchanged with similar devices or features not expressly mentioned which perform the same or similar function. Similarly, certain process steps may be interchanged or employed in combination with other steps to yield additional exemplary embodiments of tire characterization and manufacturing.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations, and/or additions to the present subject matter as would be readily apparent to one of ordinary skill in the art.

What is claimed is:

1. A method of characterizing low speed radial force variations in a tire, said method comprising the following steps:

measuring radial run out of a given tire at a first predetermined low speed;

measuring radial force variation of said given tire at a second predetermined low speed;

calculating the portion of the radial force variations measured in said step of measuring radial force variations that is created by one or more pre-selected types of stiffness variation; and subjecting the given tire to physical modification in order to create an additional radial run out at low speed.

2. The method of claim 1, wherein said one or more pre-selected types of stiffness variation comprise one or more of radial stiffness variation, tangential stiffness variation, bending stiffness variation and extensional stiffness variation.

3. The method of claim 1, wherein said calculating step comprises utilizing one or more equations of motion of a tire ring under pressure and rotation, equations for the radial forces acting on a tire ring at the contact patch, and equations for the radial forces in a fixed coordinate representation.

4. The method of claim 3, wherein said equations of motion of a tire ring under pressure and rotation are derived from modeling a tire ring as a generally elastic ring connected to a mounting fixture and pinned at an axis of rotation such that the tire ring is configured to rotate about the axis of rotation at various speeds, and wherein the tire is further modeled as being connected to said mounting fixture through distributed radial and tangential springs and dampers.

5. The method of claim 1, wherein said first and second predetermined low speeds are less than about 180 rotations per minute.

6. The method of claim 1, further comprising a step of sorting the given tire into one of at least two categories established by predetermined low speed radial force variation limitations.

7. The method of claim 1, wherein said step of subjecting the given tire to physical modification comprises grinding the given tire or adding rubber mass to the given tire at predetermined locations.

8. The method of claim 1, wherein said step of subjecting the given tire to physical modification yields an effect on said given tire such that the vectorial sum of the radial run out measured in said step of measuring radial run out and the additional radial run out effected in said subjecting step is out of phase with said one or more pre-selected types of stiffness variation determined in said calculating step for one or more harmonics.

9. A method of characterizing high speed radial force variations in a tire, said method comprising the following steps:
   measuring radial run out of a given tire at a first predetermined low speed;
   measuring radial force variation of said given tire at a second predetermined low speed;
   calculating the portion of the radial force variations measured in said step of measuring radial force variations that is created by one or more pre-selected types of stiffness variation;
   measuring radial run out of said given tire at a predetermined high speed; and
   subjecting the given tire to physical modification in order to create an additional radial run out at high speed.

10. The method of claim 9, wherein said one or more pre-selected types of stiffness variation comprise one or more of radial stiffness variation, tangential stiffness variation, bending stiffness variation, and extensional stiffness variation.

11. The method of claim 9, wherein said calculating step comprises utilizing one or more equations of motion of a tire ring under pressure and rotation, equations for the radial forces acting on a tire ring at the contact patch, and equations for the radial forces in a fixed coordinate representation.

12. The method of claim 11, wherein said equations of motion of a tire ring under pressure and rotation are derived from modeling a tire ring as a generally elastic .ring connected to a mounting fixture and pinned at an axis of rotation such that the tire ring is configured to rotate about the axis of rotation at various speeds, and wherein the tire is further modeled as being connected to said mounting fixture through distributed radial and tangential springs and dampers.

13. The method of claim 9, wherein said first and second predetermined low speeds are less than about 180 rotations per minute, and wherein said predetermined high speed is greater than about 300 rotations per minute.

14. The method of claim 9, further comprising a step of sorting the given tire into one of at least two categories established by predetermined high speed radial force variation limitations.

15. The method of claim 9, wherein said step of subjecting the given tire to physical modification comprises grinding the given tire or adding rubber mass to the given tire at predetermined locations.

16. The method of claim 9, wherein said step of subjecting the given tire to physical modification yields an effect on said given tire such that the vectorial sum of the radial run out measured in said step of measuring radial run out at a predetermined high speed and the additional radial run out effected in said subjecting step is out of phase with said one or more pre-selected types of stiffness variation determined in said calculating step for one or more harmonics.

17. A method of characterizing high speed tangential force variations in a tire, said method comprising the following steps:
   measuring radial run out of a given tire at a first predetermined high speed;
   measuring tangential force variation of said given tire at a second predetermined high speed;
   calculating the portion of the tangential force variations measured in said step of measuring tangential force variations that is created by one or more pre-selected types of stiffness variation; and
   subjecting the given tire to physical modification in order to create an additional radial run out at high speed.

18. The method of claim 17, wherein said one or more pre-selected types of stiffness variation comprise one or more of radial stiffness variation, tangential stiffness variation, bending stiffness variation and extensional stiffness variation.

19. The method of claim 17, wherein said calculating step comprises
   utilizing one or more equations of motion of a tire ring under pressure and rotation, equations for the tangential forces acting on the tire ring at the contact patch, and equations for the tangential forces in a fixed coordinate representation.

20. The method of claim 19, wherein said equations of motion of a tire ring under pressure and rotation are derived from modeling a tire ring as a generally elastic ring connected to a mounting fixture and pinned at an axis of rotation such that the tire ring is configured to rotate about the axis of rotation at various speeds, and wherein the tire is further modeled as being connected to said mounting fixture through distributed radial and tangential springs and dampers.

21. The method of claim 17, wherein said first and second predetermined high speeds are greater than about 300 rotations per minute.

22. The method of claim 17, further comprising a step of sorting the given tire into one of at least two categories established by predetermined high speed tangential force variation limitations.

23. The method of claim 17; wherein said step of subjecting the given tire to physical modification comprises grinding the given tire or adding rubber mass to the given tire at predetermined locations.

24. The method of claim 17, wherein said step of subjecting the given tire to physical modification yields an effect on said given tire such that the vectorial sum of the radial run out measured in said step of measuring radial run out and the additional radial run out effected in said subjecting step is out of phase with said one or more pre-selected types of stiffness variation determined in said calculating step for one or more harmonics.

25. A method of manufacturing tires, said method comprising the following steps:
   constructing a plurality of sets of tires, each set being characterized by a different respective combination of physical reference angles for each of a plurality of different steps of a tire building process;
   measuring radial run out of each tire in each set at a first predetermined low speed; and applying a statistical method for each of said different steps in the tire building process for each said set of tires to estimate respective low speed radial run out and a predetermined type of low speed stiffness variation parameters.

26. The method of claim 25, wherein said predetermined type of low speed stiffness variation estimated in said applying step comprise one of radial stiffness variation, tangential stiffness variation, extensional stiffness variation and bending stiffness variation.

27. The method of claim 25, further comprising the steps of:
measuring radial force variation of each tire in each set at a second predetermined low speed; and
calculating the portion of each radial force variation measured in said step of measuring radial force variation that is-respectively created by said predetermined type of stiffness variation of each tire in each said set.

28. The method of claim 27, wherein said calculating step comprises utilizing one or more equations of motion of a tire, ring under pressure and rotation, equations for the radial forces acting on the tire ring at the contact patch, and equations for the radial forces in a fixed coordinate representation.

29. The method of claim 27, wherein said first and second predetermined low speeds are less than about 180 rotations per minute.

30. The method of claim 25, wherein said statistical method comprises a signature analysis statistical method.

31. The method of claim 25, further comprising a step of determining which of said sets of tires characterized by a said respective combination of physical reference angles yields low speed radial run out and low speed stiffness variation parameters as estimated in said applying step that are substantially out of phase for one or more harmonics.

32. The method of claim 31, further comprising a step of manufacturing subsequent tires based on a tire building process corresponding to that utilized in the manufacture of the set of tires identified in said determining step.

33. A method of manufacturing tires, said method comprising the following steps:
constructing a plurality of sets of tires, each set being characterized by a different respective combination of physical reference angles for each of a plurality of different steps of a tire building process;
measuring radial run out of each tire in each set at a first predetermined low speed;
measuring radial run out of each tire in each set at a predetermined high speed; and
applying a statistical method for each of said different steps in the tire building process for each said set of tires to estimate respective high speed radial run out and a predetermined type of stiffness variation parameters.

34. The method of claim 33, wherein said predetermined type of stiffness variation is one of radial stiffness variation, tangential stiffness variation, extensional stiffness variation, and bending stiffness variation.

35. The method of claim 33, further comprising the steps of:
measuring radial force variation of each tire in each set at a second predetermined low speed; and
calculating the portion of each radial force variation measured in said step of measuring radial force variation that is respectively created by said predetermined type of stiffness variation of each tire in each said set.

36. The method of claim 35, wherein said calculating step comprises utilizing one or more equations of motion for a tire ring under pressure and rotation, equations for the radial forces acting on the tire ring at the contact patch, and equations for the radial forces in a fixed coordinate representation.

37. The method of claim 35, wherein said first and second predetermined low speeds are less than about 180 rotations per minute, and wherein said predetermined high speed is greater than about 300 rotations per minute.

38. The method of claim 33, wherein said statistical method comprises a signature analysis statistical method.

39. The method of claim 33, further comprising a step of determining which of said sets of tires characterized by a said respective combination of physical reference angles yields high speed radial run out and predetermined type of stiffness variation parameters as estimated in said applying step that are substantially out of phase for one or more harmonics.

40. The method of claim 39, further comprising a step of manufacturing subsequent tires based on a tire building process corresponding to that utilized in the manufacture of the set of tires identified in said determining step.

41. A method of manufacturing tires, said method comprising the following steps:
constructing a plurality of sets of tires, each set being characterized by a different respective combination of physical reference angles for each of a plurality of different steps of a tire building process;
measuring radial run out of each tire in each set at a first predetermined high speed; and
applying a statistical method for each of said different steps in the tire building process for each said set of tires to estimate respective high speed radial run out and a predetermined type of tangential stiffness variation parameters.

42. The method of claim 41, wherein said predetermined type of stiffness variation comprises one of radial stiffness variation, tangential stiffness variation, extensional stiffness variation, and bending stiffness variation.

43. The method of claim 41, further comprising the steps of:
measuring tangential force variation of each tire in each set at a second predetermined high speed; and
calculating the portion of each tangential force variation measured in said step of measuring tangential force variation that is respectively created by said predetermined type of stiffness variation of each tire in each said set.

44. The method of claim 43, wherein said calculating step comprises utilizing one or more equations of motion of a tire ring under pressure and rotation, equations for the radial forces acting on a tire ring at the contact patch, and equations for the radial forces in fixed coordinate representation.

45. The method of claim 43, wherein said first and second predetermined high speeds are greater than about 300 rotations per minute.

46. The method of claim 41, wherein said statistical method comprises a signature analysis statistical method.

47. The method of claim 41, further comprising a step of determining which of said sets of tires characterized by a said respective combination of physical reference angles yields high speed radial run out and stiffness variation parameters as estimated in said applying step that are substantially out of phase for one or more harmonics.

48. The method of claim 47, further comprising a step of manufacturing subsequent tires based on a tire building process corresponding to that utilized in the manufacture of the set of tires identified in said determining step.

49. A method for compensating tire radial force variations, said method comprising the following steps:
- constructing a set of one or more tires in accordance with a given tire building process;
- measuring radial run out of selected of said tires at a predetermined rotational speed;
- determining the amount of stiffness variation for one or more pre-selected types of stiffness variation that would result in minimized radial force variation for each of said selected tires based on the radial run out obtained in said measuring step;
- creating at least one stiffness variation as determined in said determining step that would compensate for the radial run out of each of said selected tires as obtained in said measuring step.

50. The method of claim 49, wherein said step of creating at least one stiffness variation is effected in production of subsequent tires at one or more steps of said given tire building process.

51. The method of claim 49, wherein said step of determining the amount of stiffness variation comprises utilizing one or more equations of motion for a tire ring under pressure and rotation, equations for the radial forces acting on a tire ring at the contact patch, and equations for the radial forces in a fixed coordinate representation.

52. The method of claim 49, wherein said predetermined rotational speed is less than about 180 rotations per minute.

53. The method of claim 49, wherein said predetermined rotational speed is greater than about 300 rotations per minute.

54. The method of claim 49, wherein said measuring step is effected with the pressure of said selected tires provided at less than about 1.0 bar.

55. The method of claim 49, wherein said one or more pre-selected types of stiffness variation are selected from the group consisting of radial stiffness variation, tangential stiffness variation, bending stiffness variation, and extensional stiffness variation.

56. A method for compensating tire tangential force variations, said method comprising the following steps:
- constructing a set of one or more tires in accordance with a given tire building process;
- measuring radial run out of selected of said tires at a predetermined rotational speed;
- determining the amount of stiffness variation for one or more predetermined types of stiffness variation that would result in minimized tangential force variation for each of said selected tires based on the radial run out obtained in said measuring step;
- creating at least one stiffness variation as determined in said determining step that would compensate for the radial run out of each of said selected tires as obtained in said measuring step.

57. The method of claim 56, wherein said step of creating at least one stiffness variation is effected in production of subsequent tires at one or more steps of said given tire building process.

58. The method of claim 56, wherein said step of determining the amount of stiffness variation is calculated from one or more equations of motion of a tire ring under pressure and rotation, equations for the tangential forces acting on a tire ring at the contact patch, and equations for the tangential forces in a fixed coordinate representation.

59. The method of claim 56, wherein said predetermined rotational speed is greater than about 300 rotations per minute.

60. The method of claim 56, wherein said measuring step is effected with the pressure of said selected tires provided at less than about 1.0 bar.

* * * * *

UNITED STATES PATENT AND TRADEMARK OFFICE
CERTIFICATE OF CORRECTION

| | | |
|---|---|---|
| PATENT NO. | : 7,213,451 B2 | Page 1 of 1 |
| APPLICATION NO. | : 10/854086 | |
| DATED | : May 8, 2007 | |
| INVENTOR(S) | : Fang Zhu and Julien Matthieu Flament | |

It is certified that error appears in the above-identified patent and that said Letters Patent is hereby corrected as shown below:

Cover Page reads "Assignee: Michelin Rechercheqet Technique, S.A." should read "Assignee: Michelin Recherche et Technique S.A."

Col. 25, I. 17 reads "is-respectively" should read --is respectively--

Col. 25, I. 22 reads "tire, ring" should read --tire ring--

Signed and Sealed this

Seventh Day of August, 2007

JON W. DUDAS
*Director of the United States Patent and Trademark Office*